(12) United States Patent  (10) Patent No.: US 12,507,289 B2
Hu  (45) Date of Patent: Dec. 23, 2025

(54) SMART WIRELESS CONNECTION HANDLING TECHNIQUES

(71) Applicant: Sonos, Inc., Santa Barbara, CA (US)

(72) Inventor: Ken Hu, Boston, MA (US)

(73) Assignee: Sonos, Inc., Goleta, CA (US)

(*) Notice: Subject to any disclaimer, the term of this patent is extended or adjusted under 35 U.S.C. 154(b) by 316 days.

(21) Appl. No.: 18/477,215

(22) Filed: Sep. 28, 2023

(65) Prior Publication Data

US 2024/0114565 A1 Apr. 4, 2024

Related U.S. Application Data

(60) Provisional application No. 63/377,759, filed on Sep. 30, 2022.

(51) Int. Cl.
*H04W 76/10* (2018.01)
*G06F 3/16* (2006.01)
*H04W 76/30* (2018.01)

(52) U.S. Cl.
CPC ............ *H04W 76/10* (2018.02); *G06F 3/162* (2013.01); *H04W 76/30* (2018.02)

(58) Field of Classification Search
CPC ........ H04W 76/10; H04W 76/30; G06F 3/162
USPC ...................................................... 455/41.2
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — April G Gonzales
(74) *Attorney, Agent, or Firm* — Finch & Maloney PLLC

(57) ABSTRACT

An example playback device is configured to determine a first characteristic associated with at least one of a first device, the playback device, or a context in which at least one of the playback device or the first device is operating. The playback device can further identify a particular connection configuration in a set of connection configurations based on the first characteristic. Each connection configuration in the set of connection configurations comprises at least one additional rule, in addition to any rule defined by a wireless communications protocol. A communication link is established with the first device via the communication interface in accordance with the wireless communication protocol and the particular connection configuration. The first communication link enables transmission of media content from the first device for playback by the playback device.

20 Claims, 10 Drawing Sheets

(56) References Cited

U.S. PATENT DOCUMENTS

| | | | |
|---|---|---|---|
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,521,074 | B2 * | 12/2016 | Peters ................. H04L 45/48 |
| 10,256,897 | B2 * | 4/2019 | Grace .................. H04L 5/006 |
| 10,735,803 | B2 * | 8/2020 | Jackson ................ G06F 3/165 |
| 11,979,777 | B2 * | 5/2024 | Polaganga ........ H04W 36/0022 |
| 12,279,008 | B2 * | 4/2025 | So .................... H04N 21/26613 |
| 2001/0042107 | A1 * | 11/2001 | Palm ...................... G06F 16/48 709/219 |
| 2002/0022453 | A1 * | 2/2002 | Balog .................. H04W 40/02 455/41.2 |
| 2002/0026442 | A1 * | 2/2002 | Lipscomb .......... H04N 21/4788 |
| 2002/0124097 | A1 * | 9/2002 | Isely ..................... H04L 65/611 709/246 |
| 2003/0157951 | A1 * | 8/2003 | Hasty, Jr. ............. H04W 88/16 455/519 |
| 2004/0024478 | A1 * | 2/2004 | Hans .................... G11B 27/034 381/119 |
| 2007/0142944 | A1 * | 6/2007 | Goldberg ............. G10H 1/0025 700/94 |
| 2011/0268051 | A1 * | 11/2011 | Tsao ..................... H04W 16/14 370/329 |
| 2012/0131098 | A1 * | 5/2012 | Wood ................... H04N 21/482 709/203 |
| 2013/0170363 | A1 * | 7/2013 | Millington ............ H04W 48/18 370/252 |
| 2013/0246916 | A1 * | 9/2013 | Reimann .............. H04N 21/439 715/716 |
| 2013/0343566 | A1 * | 12/2013 | Triplett ............ H04N 21/23406 381/77 |
| 2014/0098713 | A1 * | 4/2014 | Beckhardt .......... H04N 21/6125 370/255 |
| 2015/0317122 | A1 * | 11/2015 | Calatayud ............. G06F 3/0304 700/94 |
| 2017/0070836 | A1 * | 3/2017 | Griffiths ................. H04S 7/307 |
| 2018/0139670 | A1 * | 5/2018 | Shaw ............. H04W 36/00695 |
| 2018/0324888 | A1 * | 11/2018 | Shi ........................ H04W 76/27 |
| 2020/0128617 | A1 * | 4/2020 | Xian ................. H04W 52/0251 |
| 2020/0205227 | A1 * | 6/2020 | Xian ................. H04W 52/0219 |
| 2022/0201113 | A1 * | 6/2022 | Peng ..................... H04W 76/10 |
| 2023/0068134 | A1 * | 3/2023 | Teyeb ................... H04W 76/30 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Searching Authority, International Search Report and Written Opinion mailed on Feb. 6, 2024, issued in connection with International Application No. PCT/US2023/075408, filed on Sep. 28, 2023, 15 pages.

\* cited by examiner

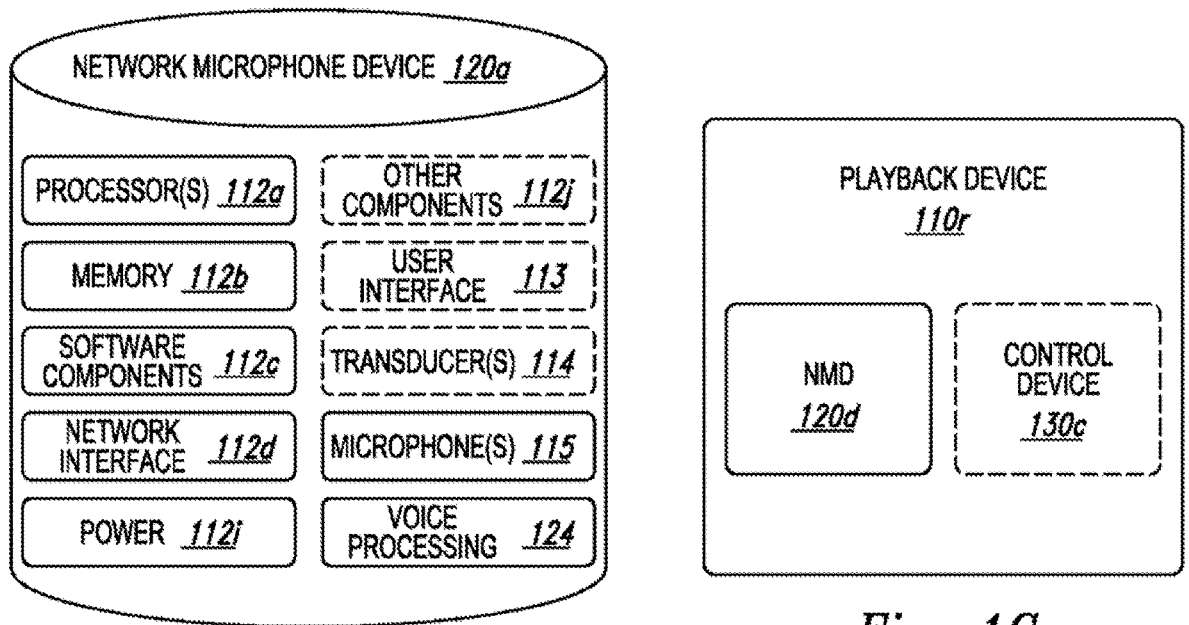
Fig. 1F
Fig. 1G
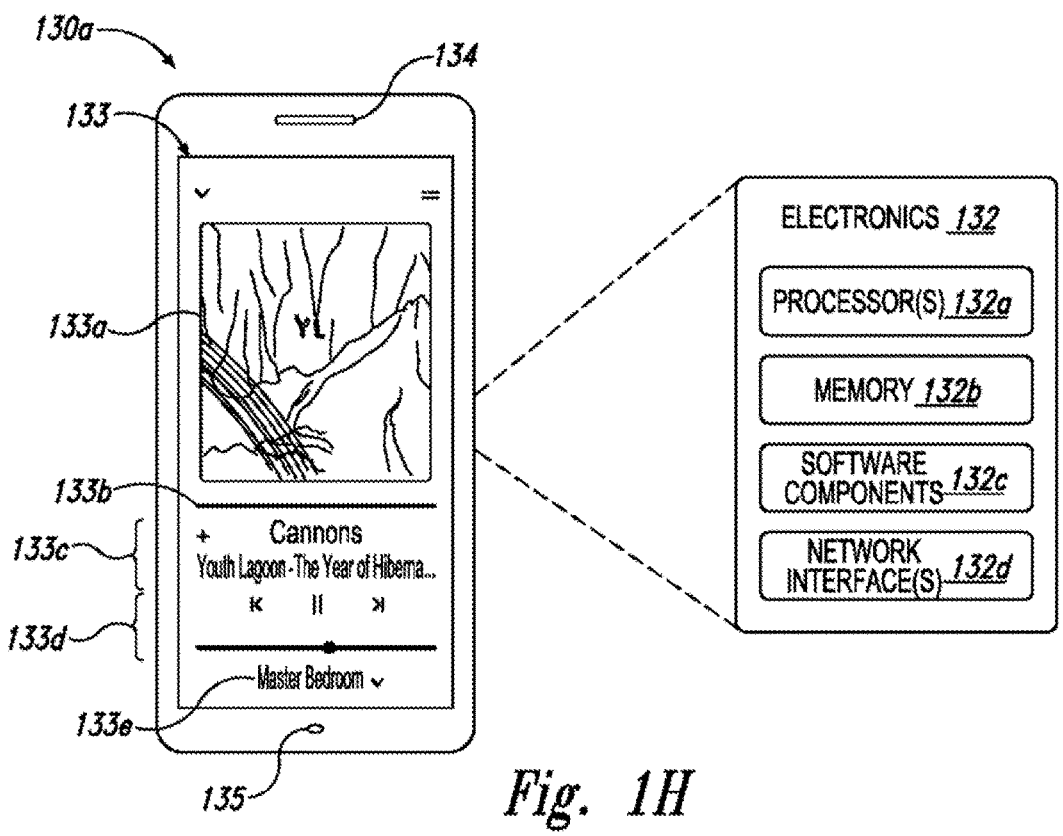
Fig. 1H

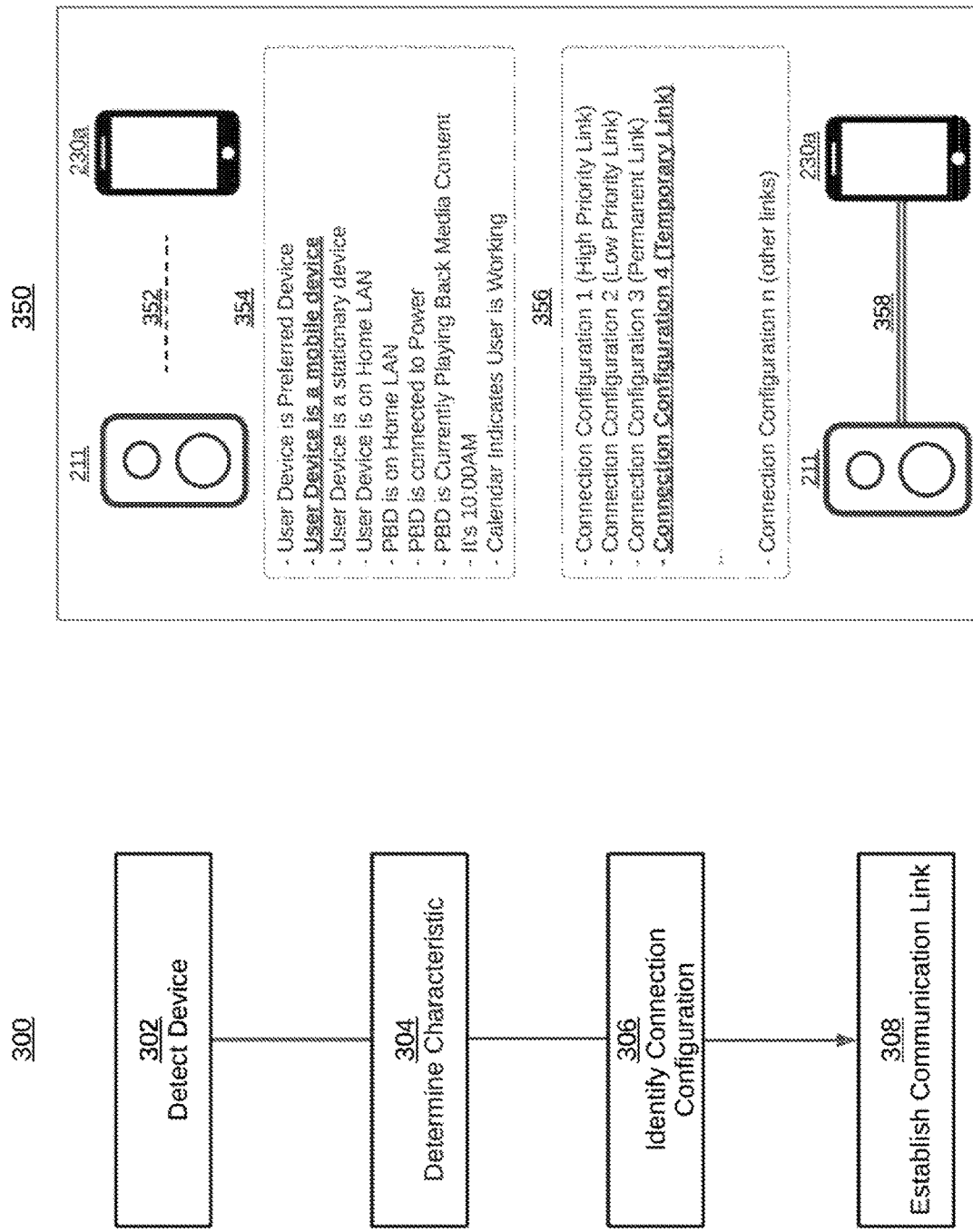

SMART WIRELESS CONNECTION HANDLING TECHNIQUES

CROSS REFERENCE TO RELATED APPLICATION

This application claims the benefit of U.S. Provisional Patent Application 63/377,759 (filed 30 Sep. 2022), which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when Sonos, Inc. began development of a new type of playback system. Sonos then filed one of its first patent applications in 2003, entitled "Method for Synchronizing Audio Playback Between Multiple Networked Devices", and began offering its first media playback systems for sale in 2005. The SONOS Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partial schematic diagram of a control device.

FIG. 3A illustrates an example flow diagram of example methods of operation for establishing a communication link with a device, in accordance with embodiments described herein.

FIG. 3B illustrates an example schematic diagram of example elements that could be involved in the execution of the methods in FIG. 3A, in accordance with embodiments described herein.

Figure 1A:
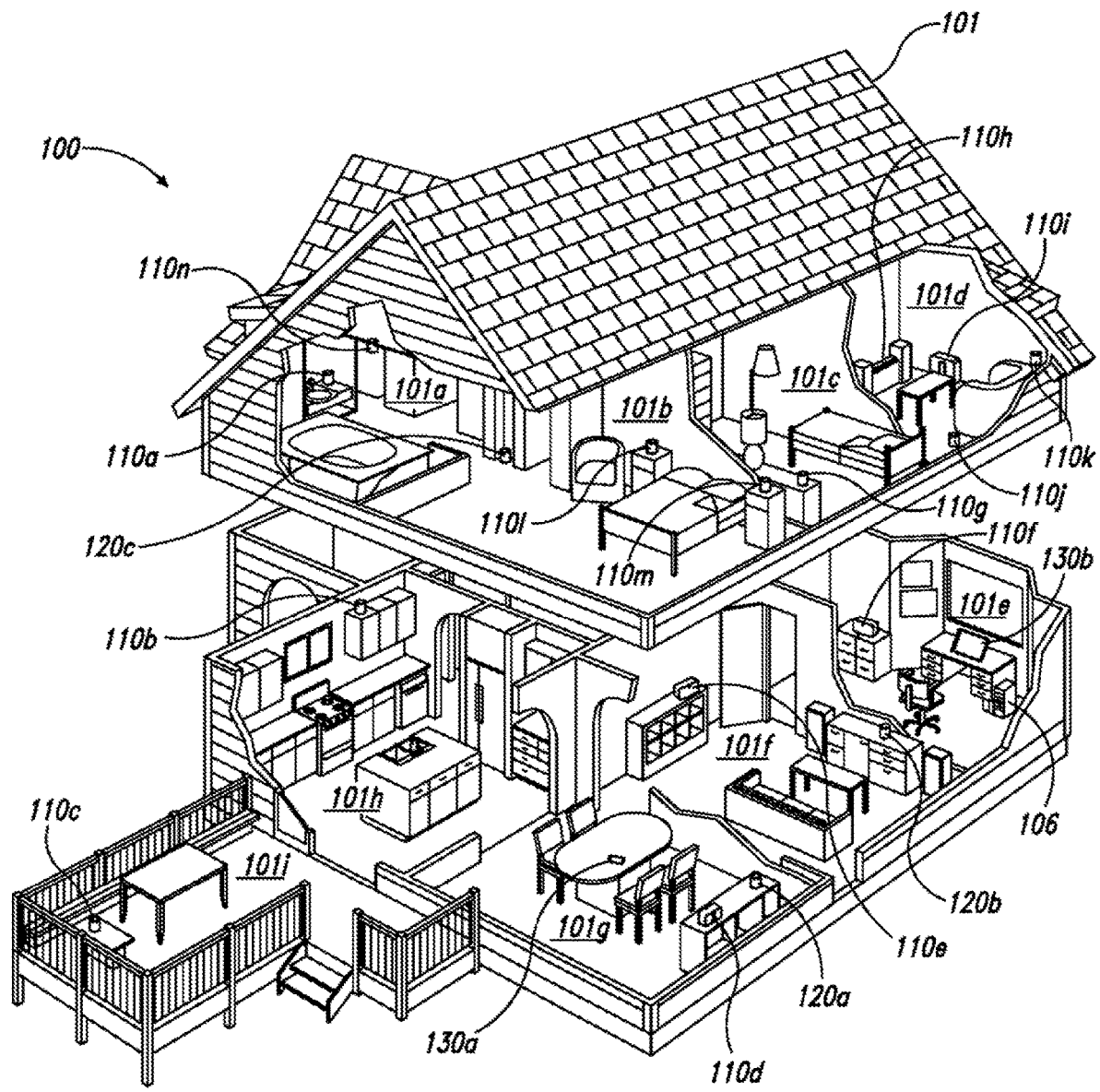
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Sonos has been a consistent innovator and leader in the sound experience space over the years. For example, Sonos created a simple and intuitive experience for playback devices that have the capability to receive multiple concurrent audio streams via different wireless communication links (e.g., a BLUETOOTH Classic communication link and an 802.11-based communication link). In particular, the playback device intelligently chooses which stream from the plurality of available audio streams to play back (and/or combine) based on a variety of information (e.g., type of audio content in each stream, time when the audio stream started, etc.) as described in U.S. Patent Application Publication 2022/0103941 (published 31 Mar. 2022), titled "Audio Playback Management of Multiple Current Connections", which is incorporated herein by reference in its entirety. As a result, users could easily interact with a playback device using their preferred method to keep the music playing. For instance, a user could start playback of an audio stream directly from a music streaming service over the Internet on a playback device and easily transition to playback of audio from their smartphone to the playback device without having to reconfigure or otherwise change settings on the playback device.

Building on the prior user experience innovation described above, Sonos has developed smart wireless connection handling techniques that intelligently manage wireless connections (e.g., using contextual information) in a manner consistent with the current operating conditions and/or environment for the device. For instance, the smart wireless connection handling techniques described herein may enable dynamic and automatic selection of user devices for transmission of media content for playback by at least one playback device in a media playback system. Additionally (or alternatively), the smart wireless connection handling techniques may enable dynamic and automatic selection of a connection configuration to handle at least one aspect of a communication link established between two devices for transmission of media content for playback.

Playback devices (such as a playback device of a media playback system) can be configured to receive media content for playback from multiple sources. For example, the playback devices can receive media content for playback directly from a computing device such as a media service provider server, from/through a controller of the media playback device, and/or from/through any device that has facilities for communicating with and transmitting media content to the playback device, including user devices such as a smartphone, a computer, a TV, a fitness device, a gaming device, etc.

In some environments such as a household or a commercial establishment, there can be multiple (or at least more than one) devices available for communication with the playback device for transmission of media content for playback. For example, in a household there can be multiple controllers and/or user devices available to send media content for playback by the playback device. In some instances, two or more devices may be available for communication with a single playback device (or bonded group of playback devices) at a given time. For example, a same playback device (or bonded group of playback devices) could be used to play back music started via a smartphone, as a computer speaker, as a TV speaker, and so on.

Usually, individual playback devices (or bonded groups) are configured to play back media content from one device at a time. Although a playback device may be physically capable of playing back multiple signals/data received from multiple devices as sound (e.g., music streaming from a computing device and a voice message from a cellphone), superimposing multiple sound outputs may not result in an enjoyable acoustic effect, because of the interference that the different sound outputs would cause with each other. Additionally, this may not be the expected and/or most desirable user experience.

Some implementations address these situations by configuring the playback device to play back media from the device that most recently attempted to communicate with and/or transmit media to the playback device. In this way, the playback device could stop playing back media content from a first device (e.g., audio received from a first smartphone via BLUETOOTH) and switch over to playing back media content from a second device (e.g., audio received from a second smartphone via BLUETOOTH). However, multiple scenarios could be possible in which the playback device may establish a communication link with and play back media content from a device which is not the device that the user expected the playback device to be connected to.

For example, if a playback device is being used as a computer speaker (e.g., via a BLUETOOTH, WI-FI or other connection) and playback of media content is started from a smartphone (e.g., via a BLUETOOTH, WI-FI, or other connection), this could cause the communication link with the computer (and any audio being transmitted for playback) to be interrupted to start playback of the audio content from the smartphone. In some instances, this solution may result in an unexpected and/or undesirable outcome because the experience of a user of the computer could not only be interrupted or downgraded to the computer audio but also completely disrupted by the new media content (e.g., music from a party in the patio) being played by the playback device.

The previous example illustrates one possible scenario, among many others, in which the playback device may handle available devices and communication links in a conventional way which does not always meet the user expected experience. The present disclosure provides examples of playback devices, systems and methods that are capable of making a decision as to with what device to establish a communication link for reception of media content for playback and how to configure such communication links depending on multiple factors.

For example, using the previous example as a non-limiting reference, it could be advantageous, in some instances, to configure the playback device to establish a communication link with the computer that is more permanent and/or that takes priority over other communication links/devices. In this way, the communication link with the computer would not easily be disturbed by other devices. It could also be advantageous, in some instances, to configure the playback device so that it can be used to play back music started by any other device (e.g., the smartphone, a music streaming service computing device, etc.) when the computer is not in use. It could also be advantageous, in some instances, to configure the playback device to establish a communication link with other devices that is more temporary and/or that has lower priority than the communication link with the computer so that, when the playback device detects that the computer is available for transmission of media content (e.g., the computer has been turned on, connected to a network of the playback device, etc.), the communication link with any other device can be terminated to establish a communication link with the computer.

The playback devices described in this disclosure can operate in accordance with various connection configurations which can determine how the playback device handles at least one aspect of communication links with other devices. For example, a connection configuration can comprise data/instructions that can be used to manage establishment and/or permanency of communication links between a playback device and other devices. As another example, a connection configuration can comprise data/instructions that can be used to manage priority of different communication links/devices over others. The playback devices can have access to a set of connection configurations so that the playback device can select the most appropriate for each communication link/device rather than treating all communication links/devices equally.

The playback devices may be able to select a connection configuration from the set of connection configurations to establish a particular communication link based on a characteristic associated with the communication link (e.g., a communication link already established and/or a communication link to be established with the playback device). For example, the characteristic can be a characteristic associated with any of the devices in the communication link (e.g., at least one of the playback device and/or the device(s) available for communication of audio content to the playback device). In some instances, the characteristic can alternatively or in combination be associated with a context in which at least one of the playback device and/or the device(s) available for communication of audio content to the playback device are operating.

In any case, rather than handling all communication links/devices the same way (e.g., in accordance with a communication protocol(s) being used to establish such communication links), the playback device(s) and systems described in this disclosure can identify a connection configuration among the set of connection configurations that is more suitable for a given context/device, and configure at least one aspect of the communication link based on the identified connection configuration.

For example, referring back to the previous example of a playback device used as a computer speaker, the playback device could be configured to establish a communication link with the computer in accordance with a connection configuration that prevents other devices from interrupting such a communication link. Similarly, the playback device could be configured to establish a communication link with other devices in accordance with a connection configuration that allows the computer to interrupt/take over such a communication link.

In some instances, the selection of the connection configuration can be made based on an assumption that one type of device (e.g., computer) is generally associated with a more permanent connection to peripherals while others (e.g., smartphones) are not. In some instances, the selection of the connection configuration can be made based on a communication protocol being used (e.g., make BLUETOOTH connections more permanent/higher priority so that they are not interrupted by WI-FI connections or vice versa). In some instances, the selection of such a connection configuration can be made based on a user indication that one device (e.g., the computer) should be a preferred device over others. Other examples are possible.

In some embodiments, for example, a playback device is disclosed. The playback device comprises a wireless communication interface configured to facilitate communications with other devices via at least one wireless communication protocol. The at least one wireless communication protocol defines a set of rules for the communications. The playback device comprises at least one processor and at least one non-transitory computer-readable medium comprising program instructions that are executable by the at least one processor such that the playback device is configured to: after detecting a first device available for communication with the playback device via the wireless communications interface, determine a first characteristic associated with at least one of: the first device, the playback device, or a context in which at least one of the playback device or the first device is operating; identify a particular connection configuration in a set of connection configurations based on the first characteristic, wherein each connection configuration in the set of connection configurations comprises at least one additional rule, in addition to any rule in the set of rules defined by the wireless communications protocol; and establish a first communication link with the first device via the communication interface in accordance with the at least one wireless communication protocol and the particular connection configuration, wherein the first communication link enables transmission of media content from the first device for playback by the playback device.

While some examples described herein may refer to functions performed by given actors such as "users", "listeners", and/or other entities, it should be understood that such references are for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices 120 ("NMDs") (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices, etc.) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation, etc.). In some embodiments, for example, the media playback system 100 is configured to play back audio from a first playback device (e.g., the playback device 110a) in synchrony with a second playback device (e.g., the playback device 110b). Interactions between the playback devices 110, NMDs 120, and/or control devices 130 of the media playback system 100 configured in accordance with the various embodiments of the disclosure are described in greater detail below with respect to FIGS. 1B through 1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane, etc.), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the second bedroom 101c, the office 101e, the living room 101f, the dining room 101g, the kitchen 101h, and the outdoor patio 101i each include one playback device 110, and the master bathroom 101a, the master bedroom 101b, and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-k can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and Method for Synchronizing Operations Among a Plurality of Independently Clocked Digital Data Processing Devices", which is incorporated herein by reference in its entirety.

a. Suitable Media Playback System

Figure 1B:
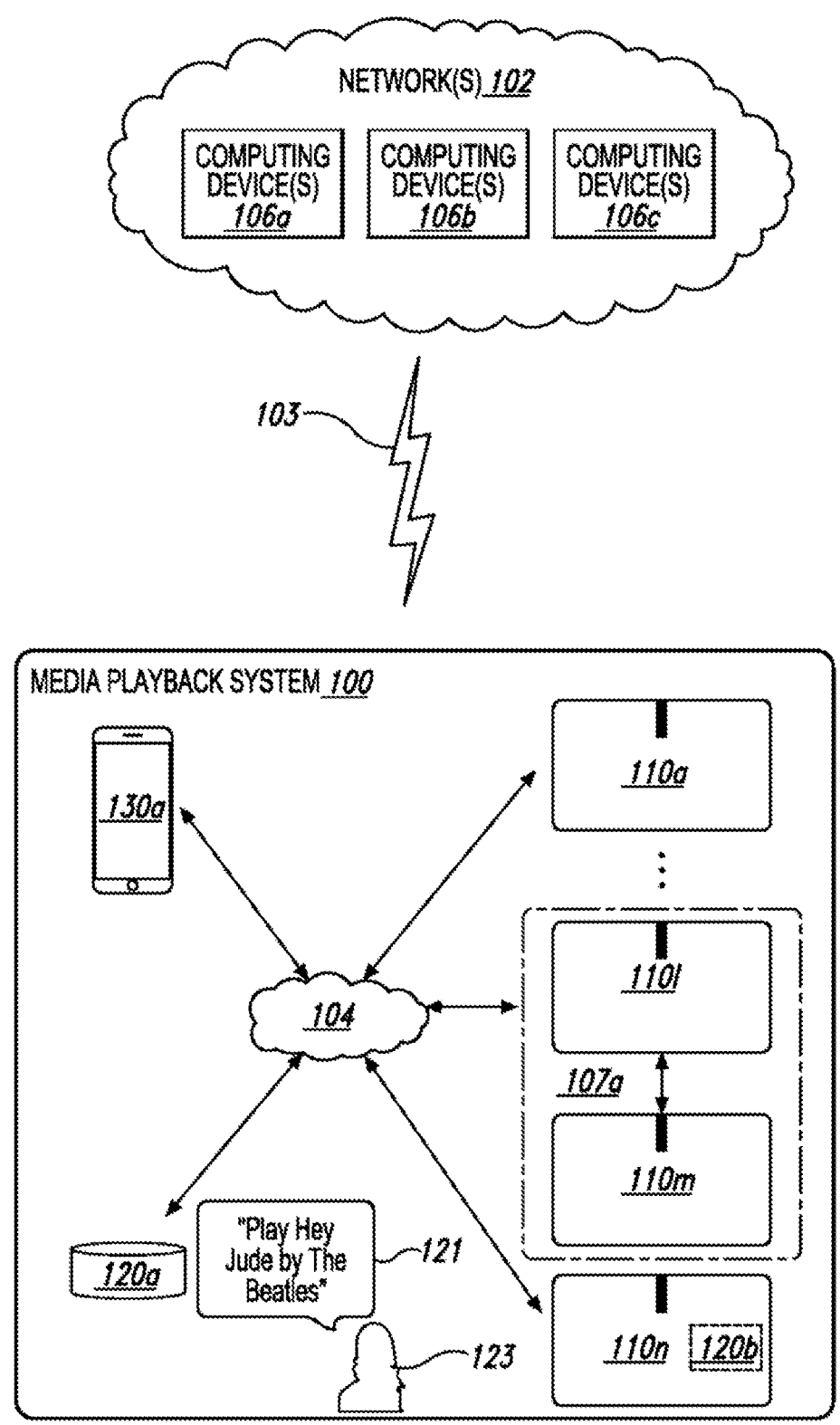
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication networks, and/or other suitable data transmission protocol networks), etc. The cloud network 102 is configured to deliver media content (e.g., audio content, video content, photographs, social media content, etc.) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WI-FI network, a BLUETOOTH network, a Z-WAVE network, a ZIGBEE network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WI-FI" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household or commercial facility communication network (e.g., a household or commercial facility WIFI network). In some embodiments, the links 103 and the network 104 comprise one or more of the same networks. In some aspects, for example, the links 103 and the network 104 comprise a telecommunication network (e.g., an LTE network, a 5G network, etc.). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud servers that host cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length, etc.) and other associated information (e.g., URIs, URLs, etc.) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*b*, each comprising one or more microphones configured to receive voice utterances from a user. In the illustrated embodiment of FIG. 1B, the NMD 120*a* is a standalone device and the NMD 120*b* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100.

In some aspects, for example, the computing device 106*c* comprises one or more modules and/or servers of a VAS (e.g., a VAS operated by one or more of SONOS, AMAZON, GOOGLE, APPLE, MICROSOFT). The computing device 106*c* can receive the voice input data from the NMD 120*a* via the network 104 and the links 103.

In response to receiving the voice input data, the computing device 106*c* processes the voice input data (i.e., "Play Hey Jude by The Beatles"), and determines that the processed voice input includes a command to play a song (e.g., "Hey Jude"). In some embodiments, after processing the voice input, the computing device 106*c* accordingly transmits commands to the media playback system 100 to play back "Hey Jude" by the Beatles from a suitable media service (e.g., via one or more of the computing devices 106) on one or more of the playback devices 110. In other embodiments, the computing device 106*c* may be configured to interface with media services on behalf of the media playback system 100. In such embodiments, after processing the voice input, instead of the computing device 106*c* transmitting commands to the media playback system 100 causing the media playback system 100 to retrieve the requested media from a suitable media service, the computing device 106*c* itself causes a suitable media service to provide the requested media to the media playback system 100 in accordance with the user's voice utterance.

b. Suitable Playback Devices

Figure 1C:
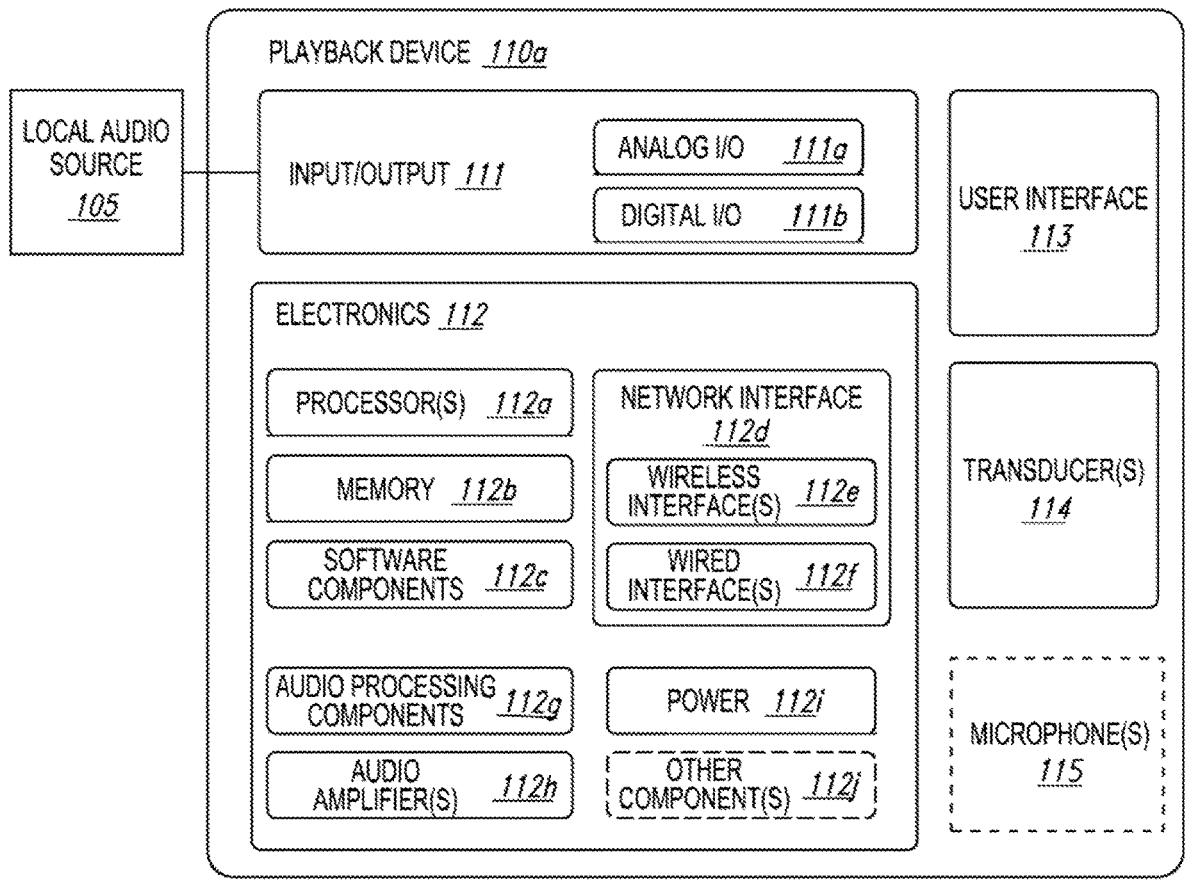
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111b includes one or more wireless communication links comprising, for example, a radio frequency (RF), infrared, WI-FI, BLUETOOTH, or another suitable communication link. In certain embodiments, the analog I/O 111a and the digital I/O 111b comprise interfaces (e.g., ports, plugs, jacks, etc.) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a BLUETOOTH connection, an ad hoc wired or wireless communication network, and/or another suitable communication link). The local audio source 105 can comprise, for example, a mobile device (e.g., a smartphone, a tablet, a laptop computer, etc.) or another suitable audio component (e.g., a television, a desktop computer, an amplifier, a phonograph such as an LP turntable, a Blu-ray player, a memory storing digital media files, etc.). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens, etc.), and one or more transducers 114 (referred to hereinafter as "the transducers 114"). The electronics 112 are configured to receive audio from an audio source (e.g., the local audio source 105) via the input/output 111 or one or more of the computing devices 106a-c via the network 104 (FIG. 1B), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases, etc.).

The processors 112a can comprise clock-driven computing component(s) configured to process data, and the memory 112b can comprise a computer-readable medium (e.g., a tangible, non-transitory computer-readable medium loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone, etc.).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds, etc.) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receive and process the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WI-FI, BLUETOOTH, LTE, etc.). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 exclude the network interface 112d altogether and transmit and receive media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DACs), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omit the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers 112h include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G amplifiers, class-H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 include a single one of the amplifiers 112h configured to output amplified audio signals to a plurality of the transducers 114. In some other embodiments, the electronics 112 omit the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
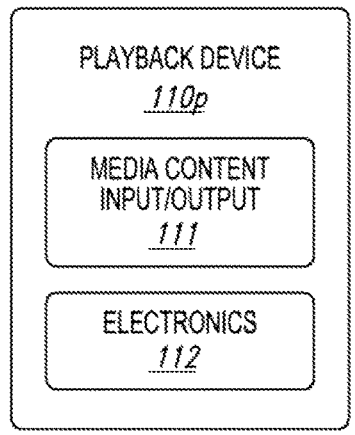
FIG. 1D is a block diagram of a playback device.

By way of illustration, Sonos presently offers (or has offered) for sale certain playback devices including, for example, a "SONOS ONE", "PLAY:1", "PLAY:3", "PLAY: 5", "PLAYBAR", "PLAYBASE", "CONNECT:AMP", "CONNECT", "AMP", "PORT", and "SUB". Other suitable playback devices may additionally or alternatively be used to implement the playback devices of example embodiments disclosed herein. Additionally, one of ordinary skill in the art will appreciate that a playback device is not limited to the examples described herein or to Sonos product offerings. In some embodiments, for example, one or more playback devices 110 comprise wired or wireless headphones (e.g., over-the-ear headphones, on-ear headphones, in-ear earphones etc.). In other embodiments, one or more of the playback devices 110 comprise a docking station and/or an interface configured to interact with a docking station for personal mobile media playback devices. In certain embodiments, a playback device may be integral to another device or component such as a television, an LP turntable, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
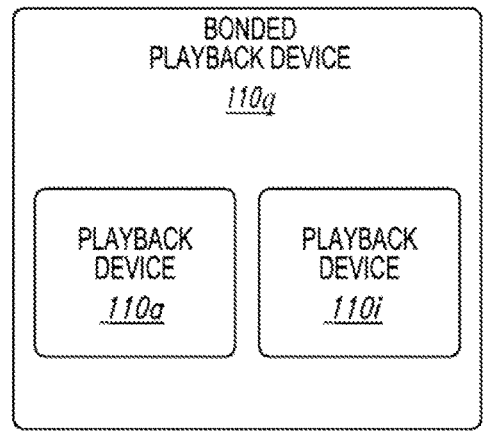
FIG. 1E is a block diagram of a bonded playback device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is a full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 112h, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing components 124, and only a portion of the components of the electronics 112 described above with respect to FIG. 1C. In some aspects, for example, the NMD 120a includes the processor 112a and the memory 112b (FIG. 1C), while omitting one or more other components of the electronics 112. In some embodiments, the NMD 120a includes additional components (e.g., one or more sensors, cameras, thermometers, barometers, hygrometers, etc.).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing components 124 (FIG. 1F). The playback device 110r optionally includes an integrated control device 130c. The control device 130c can comprise, for example, a user interface (e.g., the user interface 113 of FIG. 1C) configured to receive user input (e.g., touch input, voice input, etc.) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing components 124 receive and analyze the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON VAS, a user might speak the activation word "Alexa". Other examples include "Ok, Google" for invoking the GOOGLE VAS and "Hey, Siri" for invoking the APPLE VAS.

After detecting the activation word, voice processing components 124 monitor the microphone data for an accompanying user request in the voice input. The user request may include, for example, a command to control a third-party device, such as a thermostat (e.g., NEST thermostat), an illumination device (e.g., a PHILIPS HUE lighting device), or a media playback device (e.g., a SONOS playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partial schematic diagram of the control device 130a (FIGS. 1A and 1B). As used herein, the term "control device" can be used interchangeably with "controller" or "control system". Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone, etc.) on which media playback system controller application software is installed. In some embodiments, the control device 130a comprises, for example, a tablet (e.g., an iPad™), a computer (e.g., a laptop computer, a desktop computer, etc.), and/or another suitable device (e.g., a television, an automobile audio head unit, an IoT device, etc.). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 132a to perform those functions. The software components 132c can comprise applications and/or other executable software configured to facilitate control of the media playback system 100. The memory 132b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE, etc.). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection, etc.) from the control device 130*a* to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133*a* (e.g., album art, lyrics, videos, etc.), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year, etc.) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone, etc.). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some embodiments, the one or more speakers comprise individual transducers configured to correspondingly output low frequencies, mid-range frequencies, and/or high frequencies. In some aspects, for example, the control device 130*a* is configured as a playback device (e.g., one of the playback devices 110). Similarly, in some embodiments the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound, etc.) and/or configured to facilitate filtering of background noise. Moreover, in certain embodiments, the control device 130*a* is configured to operate as a playback device and an NMD. In other embodiments, however, the control device 130*a* omits the one or more speakers 134 and/or the one or more microphones 135.

For instance, the control device 130*a* may comprise a device (e.g., a thermostat, an IoT device, a network device, etc.) comprising a portion of the electronics 132 and the user interface 133 (e.g., a touch screen) without any speakers or microphones.

III. Example Smart Wireless Connection Handling Techniques

Figure 2:
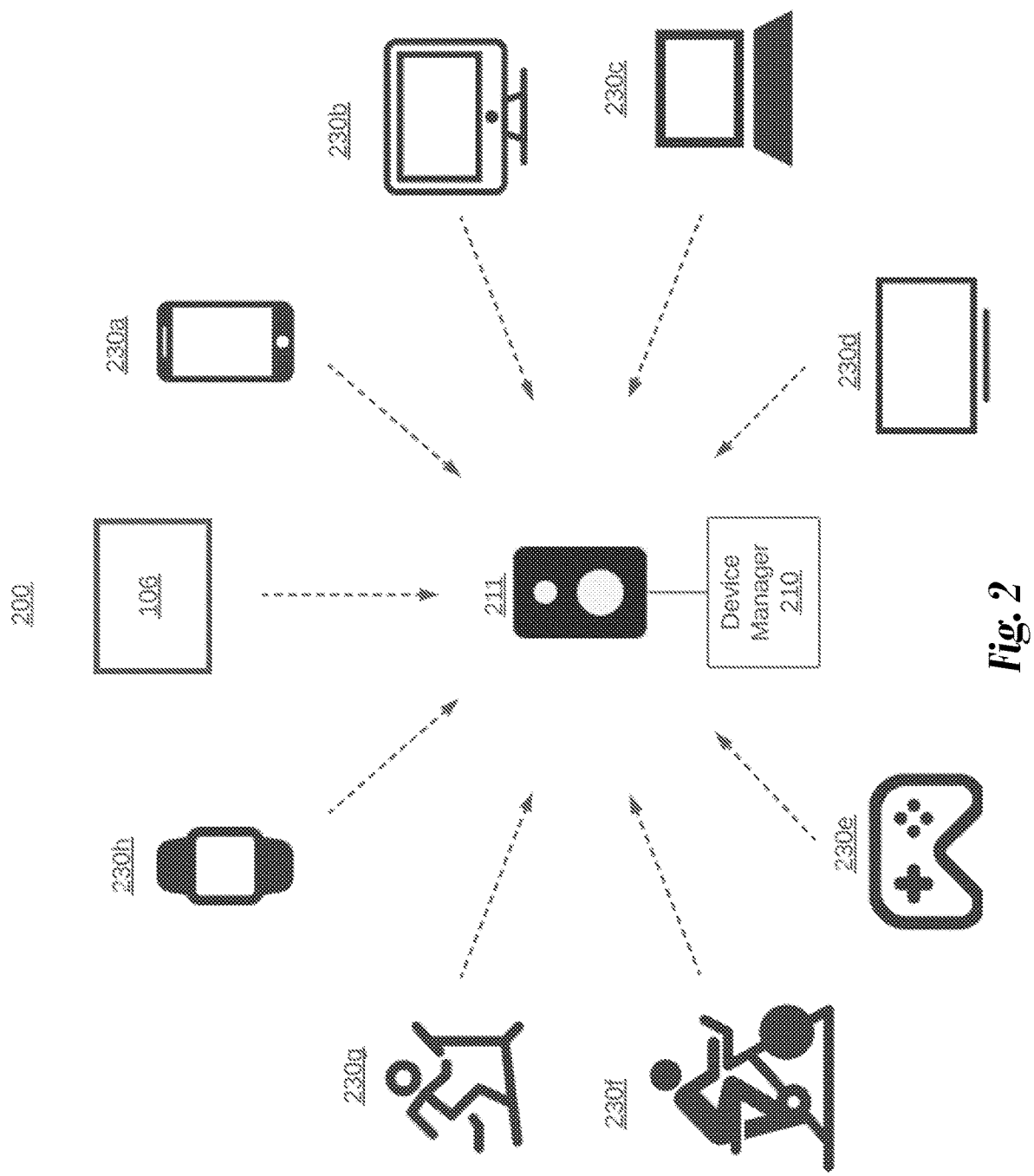
FIG. 2 is a schematic diagram of an environment including a playback device and a set of example user devices available for communication with the playback device, in accordance with embodiments described herein.

FIG. 2 is a schematic diagram of an example environment 200 including playback device(s) 211 and a set of example user devices 230*a*, 230*b*, 230*c*, 230*d*, 230*e*, 230*f*, 230*g* and 230*h* (generally referred to as user devices 230), available for communication with the playback device 211. Environment 200 could be an instance of environment 101 described with reference to FIG. 1A, playback device 211 could comprise one or more of playback devices 110*a-n* described with reference to FIG. 1A, and user devices 230 can be user devices in such environment. Playback device 211 could represent a single playback device or multiple playback devices (e.g., operating in a media playback system, such as media playback system 100). In this way, even though a single playback device is represented in FIG. 2 as playback device 211, playback device 211 could be implemented as a single playback device configured to operate alone or multiple playback devices configured to operate in combination with each other in a media playback system (e.g., as a stereo pair with another playback device, in a bonded group, and/or in a synchrony group with one or more additional playback devices).

The playback device 211 can be configured to communicate with one or more of the user devices 230. The playback device 211 can communicate with such user devices 230 to, for example, receive media content such as audio signals/data and play back the received media content or data as sound. The playback device 211 can alternatively or in combination communicate with such user devices 230 to, for example, transmit and/or receive signals/data such as control signals, commands, or other data. In some instances, the playback device can communicate with the user devices 230 to receive data and forward such data to other devices such as other playback devices in a media playback system (e.g., media playback system 100 above).

The user devices 230 may include those devices that are capable of communicating with the playback device(s) 211 and include an interface through which a user can directly interact with the device. Examples of user devices 230 include, for instance, a smartphone 230*a*, a desktop computer 230*b*, a laptop 230*c*, a TV 230*d*, a gaming device 230*e*, a smart fitness device such as a smart bike 230*f* and/or a smart treadmill 230*g*, and/or a wearable device such as a smart watch 230*h*. In some instances, the user devices 230 are devices capable of transmitting media content for playback to the playback device 211. In some instances, the user devices 230 can operate as a control device (e.g., as one or more of controllers 130*a-b* described with reference to FIG. 1A). For example, the user devices 230 can be configured to receive a user input and, in response, cause one or more playback devices to perform an action(s) or operation(s) associated with the user input. In addition to the user devices 230, FIG. 2 also includes a computing device, such as computing devices 106 described with reference to FIG. 1B, which can also be available for communication of media content for playback by the playback device.

The playback device 211 and the user devices 230 can communicate via any suitable communication link. A communication link, as used herein, can be understood as a connection between two or more devices (wired and/or wireless) established using any suitable communication protocol, such connection allowing communication (transmission/reception) of media content (e.g., audio data/signals) for playback by the playback device 211. In some instances, the playback device 211 can be configured to communicate with the user devices 230 over a communication link established via the input/output 111 and/or the network interface 112d described with reference to FIG. 1C and a corresponding interface of the user devices 230. For example, the playback device 211 can be configured to communicate with the user devices 230 over a communication link established via one or more wireless communication interfaces, such as wireless interfaces 112e described with reference to FIG. 1C.

The wireless communication interface can be configured to facilitate/enable communications (e.g., establishment of a communication link) with other devices via one or more wireless communication protocols. Examples of wireless communication protocols comprise BLUETOOTH (e.g., BLUETOOTH LOW ENERGY (BLE), BLUETOOTH Classic, BLUETOOTH LE AUDIO, etc.), 802.11-based protocols (e.g., 802.11g, 802.11n, 802.11ac, 802.11ax, 802.11be, WI-FI 3, WI-FI 4, WI-FI 5, WI-FI 6, WI-FI 7, etc.), ZIGBEE, NFC (Near Field Communication), SIGFOX, LORAWAN, Z-WAVE, OPC UA, Cellular, or MQTT. A wireless communication protocol defines a set of rules for communications established in accordance with such protocol. In some embodiments, communication links between the playback device 211 and one or more user devices 230 can be established in accordance with the set of rules defined by the specific communication protocol being used for communication.

In some instances, multiple user devices 230 and/or computing devices 106 can be available for communication with the playback device 211 at a given time. The various user devices and/or computing devices 106 can have media content available for playback by the playback device. As explained before in this disclosure, the playback device may be configured to play back media content received from one device at a time. In this way, the user experience is not compromised by playing back more than one stream of audio content at a time, which can result in an unpleasant and undesired effect (e.g., two different songs playing at the same time by the same playback device).

In some implementations, the playback device may be configured to receive media content from multiple user devices 230 and/or computing devices 106, and administer such media content in various ways. For example, the playback device may be configured to add media items received from the various devices to a common queue and playback such media items in a defined or undefined order (e.g., as the media items were received, as selected by a user, etc.). As another example, the playback device can be configured to add media items received from different devices to individual queues and playback such queues in a defined or undefined order, or select media items for playback from the different queues following a given playback criteria, etc.

However, in implementations in which the playback is configured to receive media content for playback from a single device at a time, the selection of what device to play back media content from can be made in various ways. Some implementations involve the playback device playing back audio from the user device/computing device that was most recently connected to the playback device, and/or that most recently transmitted media content for playback, and/ or that most recently instructed the playback device to play back media content, or any other criteria that results in the playback device playing back audio received from a device at a time.

With the various implementations mentioned above, certain situations may arise in which the playback device may end up taking an action which is not the action expected by the user (for example connecting to and/or playing back audio content received from a device which is not the device that the user intended). For example, with some of those implementations, there can be a situation in which playback of first audio content received from a first device could be interrupted to start playback of second media content received from a second device (e.g., if the second device was most recently connected or otherwise was able to take priority over the first device) when the first audio content was actually the audio content intended for playback by the playback device.

One practical example could be a scenario in which a first user is working out at a first room using a fitness equipment such as bike 230f. The bike 230f could be connected to the playback device 211 for playback of content associated with the workout (e.g., music, instructions, timer alarms, etc.). Another user, or maybe the same user via a different device (e.g., the user could be using a smartphone 230a while working out) may perform an action (e.g., start playback of different media content) that could cause the other device (smartphone 230a) to attempt to communicate with and/or send the media content to the playback device 211 for playback. In this case, depending on how the playback device is configured, the playback device could stop playback of the media content from the bike 230f to start playback of the media content from the smartphone 230a. However, this may be an undesired outcome for the user on the bike as the user could still be working out and desire media content from the bike 230f to prevail over other media content, at least while the user is working out.

However, other situations could occur in which the user may desire that a device indeed interrupts and takes over transmission of audio content for playback. For example, the user may have started playback of media content at playback device 211 at a first moment. For example, media content may be being streamed from computing device 106 in response to a user input (e.g., via the playback device itself, a controller, or any of the user devices such as smartphone 230a). Later, the user could start bike 230f for a workout. Bike 230f could attempt to communicate with and transmit media content to the playback device 211, currently playing back other media content. In this case, depending on how the playback device is configured, the playback device could ignore/reject the media content from the bike, or stop playback of any previous media content to start playback of the media content from the bike.

In some situations, the user may have user devices that should be prioritized over others and with which a communication link for transmission of media content for playback should persist and/or be more permanent, at least at a certain time and/or for a certain period of time. Taking the previous example as a reference, the user may prefer that the bike 230f takes priority over any other device (at least while the user is scheduled to use and/or using the bike). In this way, the communication link with the bike 230f can override other communication links and/or devices for transmission of audio content, and the playback of audio content from the bike should not be easily interrupted by other devices.

As another example, the user may use playback device 211 as a speaker for a computer 230b. In some instances, it may be desired that playback device can be used as a regular playback device that any other device can communicate with and transmit media content for playback. However, in some instances, it may be desired that the playback device be configured to be automatically dissociated from any other device and associated with the computer 230*b* as soon as the computer is turned on. In other words, it may be desired that the computer 230*b* takes priority over any other devices and that a communication link between the computer 230*b* and the playback device 211 be a more permanent link so that it is not easily interrupted by other devices. Similarly, it can be desired that a communication link between the computer and the playback device be re-established whenever the two devices are able to communicate. In this way, the playback device could be able to receive media content for playback from any device so long as the computer is not in use, but will attempt to reconnect and give the required priority to the communication link with the computer if it is detected that the computer is in use.

As another example, playback device 211 may be used as part of a home theater set to be used with a device such as TV 230*d*. In some instances, it may be desirable to make its connection with the TV 230*d* more permanent and/or of higher priority than communication with other devices. Playback device 211 could be configured to communicate with and playback audio content received from any other device, so long as the TV is not in use. Playback device 211 could also be configured to stop playback of media content received from any other device when the TV 230*d* is in use, so that it is available for playback of media content associated with the home theater set (e.g., received from the TV 230*d*) and playback is not likely to be interrupted by other devices.

As evidenced by the examples provided above, having a playback device with a static configuration for handling communication links with multiple devices available for transmission of media content for playback may not be an optimal solution for the user. It could be advantageous to provide the playback device with capability to infer and/or select with which device to communicate with for playback of media content at a given time. A generic configuration (e.g., operating in accordance with the different communication protocols, rules, and/or instructions accessible to the playback device to handle communication with other devices generally) may be suitable for a playback device that communicates generally with fewer user devices and not likely simultaneously, where the intended use of the playback device may be more evident. However, such an approach may not offer the level of flexibility that a more complex environment requires (e.g. an environment with multiple user devices and/or multiple playback devices used at different times for different purposes).

In some instances, the playback device can have access to a set of connection configurations from which the playback device can select the most appropriate connection configuration for a given communication link with a given device. The playback device may be able to select a connection configuration from the set of connection configurations to establish a particular link based on a characteristic associated with the communication link (e.g., a communication link already established and/or a communication link to be established). For example, the characteristic can be a characteristic associated with any of the devices in the communication link (e.g., at least one of the playback device(s) 211 and/or a user device 230/computing device 106). In some embodiments, the characteristic can alternatively or in combination be associated with a context in which at least one of the playback device(s) or the user device/computing device is operating.

For example, the set of connection configurations could include a connection configuration more appropriate for links that are more likely to be permanent for at least a period of time (e.g., a link with a stationary device such as a computer or a TV), a connection configuration more appropriate for links that are more likely to be ephemeral/temporary (e.g., a link with a mobile device, a link when the playback device is not connected to power, a link when the devices are not on LAN, etc.), a connection configuration more appropriate for high priority links (e.g., a link with a preferred device), a connection configuration for low priority links (e.g., a link with unknown or not preferred devices), a connection configuration for preferred devices, etc.

Depending on the selected connection configuration, different parameters, rules and instructions can be applied to different communication links. In some instances, by selecting a connection configuration under which the playback device can operate, and referring back to such a connection configuration whenever there is another device available for communication with the playback device, the playback device can be configured to make decisions as to with what device to establish a communication link for transmission of media content for playback, and how to handle such a communication link.

A connection configuration can be a data structure comprising data that can be used to manage at least one aspect of one or more communication links between the playback device 211 and the user devices 230. In some instances, a connection configuration can comprise data that can be used to manage permanency of communication links between the playback device 211 and the user devices 230. Additionally (or alternatively), a connection configuration can comprise data that can be used to manage priority of communication links between the playback device 211 and the user devices 230 over other communication links.

In some instances, a connection configuration is in the form of, or otherwise comprises, a set of instructions that can be executed by the playback device 211, for example in response to certain events. In some instances, a connection configuration comprises a set of one or more rules for managing communication links established between the playback device 211 and the user devices 230. The set of one or more rules in the connection configuration can comprise at least one additional rule, in addition to any rule in the set of rules defined by the wireless communications protocol used for a given communication. In some instances, the at least one additional rule governs at least one connection handling behavior. The rules can be in the form of or otherwise comprise instructions to be executed by the playback device.

In some instances, a connection configuration can comprise instructions/rules that define and/or establish permanency of a communication link established in accordance with such a connection configuration. For example, the connection configuration can define whether a particular communication link should be a more permanent (or substantially permanent) communication link or a more temporary (or substantially temporary) communication link. A temporary communication link can be a communication link configured to be terminated after a period of time and/or in response to certain events (e.g., a time-out due to inactivity). A permanent communication link can be a communication link configured to persist for a longer (or indefinite) period of time and/or be re-established in presence of the same and/or other events that would otherwise cause the communication link to be terminated.

A connection configuration can define a set of events upon which a particular communication link should persist (e.g., be re-established if lost) and/or be terminated. The connection configuration can alternatively or in combination comprise a set of instructions/rules to be executed in response to certain events so that the playback device is configured to either re-establish or terminate a communication link when such events occur. An event can be any event that occurs at and/or is detected by the playback device 211 (or any device in the playback system 100) and/or any of the user devices 230/computing devices 106. In some instances, an event is an event that originates from, affects or is otherwise related to the communication link between the playback device and one of the user devices 230.

In some instances, an event can be the end of a duration of time after which a communication link should be terminated. A connection configuration can define the duration of time after which a communication link can be terminated. Such duration of time can be defined for a temporary link and be substantially longer (or indefinite) for a more permanent communication link. The connection configuration can also or alternatively comprise instructions/rules to terminate the temporary communication link after the period of time and/or to ensure the permanent communication link is not terminated and/or is re-established even after the period of time has ended.

In some instances, an event can be an interruption of the communication link. Multiple factors can cause the communication link to be interrupted such as for example one of the playback device and/or the user device losing communication with the other. Devices can lose communication for various reasons such as when at least one of the devices is turned off; at least one of the devices is out of battery; at least one of devices is outside of the communication range of the other device (e.g., outside a BLUETOOTH communication range); at least one of the devices is outside of a communication range of a network connecting the devices (e.g., a WI-FI network); at least one of the devices is malfunctioning (e.g., hardware/software issue); at least one of the devices entered a power saving, sleep or other mode that may restrict its communication capabilities, etc. In some instances, a connection configuration can comprise instructions/rules to re-establish and/or terminate a communication link after an interruption. For example, for a permanent communication link, the instructions/rules can be to automatically re-establish the communication link after an interruption, whereas a temporary communication link could be terminated in a case of such interruption.

It should be understood that any kind of communication link (temporary or permanent as used in this disclosure) can be re-established (e.g., manually re-established) upon user interaction. For example, in a conventional BLUETOOTH link between a headset and a computer, if the link is lost, the user can manually attempt to reconnect the devices. Re-establishment of permanent links, as used in this disclosure, refers to an automatic reconnection performed by the devices based on data (e.g., connection configuration) that indicates the communication link should be re-established, so that the user does not need to take any action and the connection can be re-established seamlessly.

In some instances, an event can relate to inactivity in the communication link. For example, if the communication link is established to enable transmission of media content from the user device for playback by the playback device, an event can occur when no media content is being transmitted over the communication link (for example when the playback device detects or determines that no media content is being received). Inactivity can be determined by one type of communications irrespective of others. For example, the communication link can be said to be inactive when no media content is being transmitted, even if other data such as control and/or signaling messages are being exchanged over the same and/or a different communication channel between the same devices.

Inactivity of the communication link could impact the communication link in various ways. For example, some conventional communication links can be configured to be terminated or suspended after a period of inactivity, as is the case for conventional operation using communication protocols such as BLUETOOTH. In some cases, after a period of inactivity, either device could be configured to enter a power saving, sleep, idle, or any other mode that limits its communication capabilities. In such cases, even if the communication link is not terminated precisely because of the inactivity of the communication link, it can be terminated because communication with such device may be lost.

A connection configuration can include instructions/rules for deciding whether to maintain and/or terminate a communication link in case of inactivity (e.g., if no media content is being transmitted for playback by the playback device). In some instances, the instructions/rules could cause the playback device to maintain the communication link even when no media content is being transmitted over the communication link (for example so that more permanent communication links persist even if inactive). In some instances, the connection configuration can comprise a duration of time after which the first communication link is to be terminated when no media content is being transmitted over the communication link. In those instances, the instructions/rules can cause the playback device to terminate the communication link after the duration of time (for example so that temporary links do not persist after such period of time).

In some instances, a connection configuration can comprise data and/or instruction/rules that can be used to manage priority of communication links between the playback device 211 and the user devices 230 over other communication links. For example, a connection configuration can define a priority level that can be assigned to the communication links established in accordance with such a connection configuration. The priority level can be a value stored as part of the connection configuration. The priority level can be an indication of whether a particular communication link is priority or not (e.g., high priority links can be flagged as such). The priority level can be defined with respect to other communication links that can be established between the playback device 211 and one or more user devices 230. The priority level as indicated by a connection configuration can be assigned to or associated with any communication link established in accordance with such a connection configuration. In this way, the playback device can administrate establishment and/or termination of communication links based on their priority. For example, if a communication link indicated as high priority (based on a corresponding connection configuration) is currently established between the playback device and one of the user devices 230, other potential communication links between the playback device and other user devices should not be established. The priority level can be assigned to or otherwise associated with the communication links, the devices, and/or the communication protocols used to communicate, or any other factor.

In some instances, the playback device may be configured (for example based on instructions in the connection configuration) to reject and/or ignore other devices attempting to communicate with or available for communication with the playback device when the playback device is already communicating with another device via a high priority link. Alternatively, if a communication link indicated as low priority (based on a corresponding connection configuration) is currently established between the playback device and one of the user devices 230, other potential communication links between the playback device and other user devices indicated as high priority could be established and the current link terminated.

In some instances, if the playback device is not currently receiving media content from the user device via a high priority link, communication links can be established with other devices even if the communication links have lower priority, so that the playback device can receive media content for playback from other devices as long as no media content is being transmitted via the higher priority link. Similarly, if a more permanent communication link is established with a particular device, but such particular device is not currently transmitting media content for playback by the playback device, the playback device can be configured (e.g., based on the connection configuration) to allow other devices to transmit media content for playback. The playback device can be configured to constantly monitor for availability of media content coming from the device that requires the more permanent connection so that it can switch over as soon as or after the device becomes available for transmission of media content. In this way, from the perspective of the more permanent device and/or a user of such device, the playback device is permanently connected to it when in use, but can also be used for other purposes when not in use.

In some instances, the connection configuration comprises instructions/rules for handling coexistence between multiple communication links. For example, the playback device may be configured to receive media content for playback from one device via a first communication link and transmit the media content for playback (or at least part of it) to another device (e.g., another playback device) via another communication link. In this way, the playback device can operate in conjunction with other devices via multiple communication links. The playback device could transmit media content to other devices for example if the playback device is acting as a hub between a user device and the other devices. The playback device could transmit media content to other devices for example if the playback device is grouped (e.g., stereo paired, in a synchrony group, etc.) with other devices. In this way, any media content received from a user device via a first communication link (e.g., a BLUETOOTH link) can be shared with the other members of the group via another communication link (e.g., a WI-FI link).

In some instances, a connection configuration comprises a value for at least one parameter required for managing at least one aspect of the communications link. In some instances, a connection configuration comprises a value for at least one parameter required by the wireless communication protocol being used. For example, if the communication protocol is BLUETOOTH, one parameter defined by the connection configuration can be a Link_Supervision_Timeout value. In this example, by having different connection configurations associated with different values, different communication links established in accordance with the different connection communications can have different times to disconnect when no packets are being received. For example, a connection configuration for a permanent link could have a Link_Supervision_Timeout value of 0x0000 so that it remains connected even when no packets are being received, etc. Any other parameter can be defined by the connection configuration.

In some instances, connection configurations can be stored locally on the playback device. In other instances, the connection configuration can be otherwise accessible to the playback device. For example, the connection configuration can be stored in other playback devices in the media playback system 100, in a controller of the media playback system 100, in a remote storage and/or computing device working in association with the playback device such as a storage device, a remote database, a cloud server, etc. In some instances, the connection configurations can be distributed among various devices. For example, a library of connection configurations can be available at a computing device, and the playback device may download and/or access specific connection configurations as needed. For example, if the playback device detects a new type of device available for communication, the playback device may obtain a suitable connection configuration from the computing device and store it locally for future use.

In some instances, connection configurations are default connection configurations (for example provided by a device manufacturer). In some instances, connection configurations can be modified by a user, for example via a controller device. In this way, the user can have control over one or more aspects of the communication links to be established between the playback device and other devices. In some instances, connection configurations can be created/generated by a user. For example, a user of the playback device could be able to define how they want the playback device to handle the different devices. This could be done as part of a set up process or as the user onboards new devices. For example, when a new device attempts to communicate with the playback device, the playback device may detect that there is no connection configuration to be used with such device and prompt the user to select/create one. For example, the user could be prompted to select whether the device should be a preferred device, to assign a level of priority or an existing connection configuration to the new device. Alternatively, the playback device could generate/access a connection configuration for the new device.

As mentioned before, the playback device may be able to select one connection configuration from the set of connection configurations to establish a particular link based on a characteristic associated with the communication link (e.g., a communication link already established and/or a communication link to be established). For example, the characteristic can be a characteristic associated with any of the devices in the communication link (e.g., at least one of the playback device 211 and/or a user device 230/computing device 106). In some embodiments, the characteristic can alternatively or in combination be associated with a context in which at least one of the playback device or the user device is operating.

A characteristic associated with a user device 230 can be any characteristic of the user device. The characteristic of the user device can comprise a device identifier. The device identifier can be an identifier intrinsic to the device such as an identifier assigned by a device manufacturer, a system (e.g., cloud, device etc.) generated ID, etc. Examples of device identifier include any unique device ID such as a UDID, MAC address, IMEI number, ESN number, MEID, etc. Other types of device identifier can include identifiers assigned by other devices such as an IP address or other identifier assigned by an external system such as a cloud server. Other examples of device identifiers can be identifiers used for specific communication purposes such as by a specific communication protocol (e.g., BLUETOOTH name or ID).

The characteristic of the user device can be a device name. In some instances, the device name and the device identifier are the same identifier. In other instances, the device name can be a name assigned by a user. For example, a user may choose to assign and/or change the name of their devices so that the user can recognize the device more easily among a list of devices or change it to a name that the user prefers. For example, it is common that users assign or change the BLUETOOTH name to their devices so that the assigned name appears in other devices communicating with or available to communicate with via BLUETOOTH.

The characteristic of the user device can be a type of device. In some instances, the type of device can be derived from the device identifier (e.g., from the MAC address). In some instances, the type of device can be derived from other information or provided by the device itself (e.g., during a handshake process before/while establishing a communication link). In some instances, the type of device is a specific type of device such as smartphone, TV, headphones, etc. In some instances, the type of device is a more generic type of device that groups devices within a certain category such as portable, wearable, stationary, computer, fitness, etc.

The characteristic of the user device can comprise a status of at least one aspect of the device. For example, the status can indicate whether the user device is powered on or off, whether the user device is active (e.g., being used by a user), whether it is operating on battery, a battery level, whether the device is connected to a network and the state of such network connection, etc. The status can also indicate whether the user device has media content available for playback that can be played back by the playback device, etc.

The characteristic of the user device can comprise a preference level for the user device. For example, a user of the playback device may indicate a preference level for at least one of the different user devices 230 (e.g., a preferred device), so that the playback device can select a connection configuration suitable for such a preferred device. For example, a connection configuration for a preferred device may indicate that a communication link with such a preferred device should be given the highest priority over other communication links, that such a link should persist (e.g., not be interrupted by other devices, be re-established in case of an event affecting such a communication link, etc.) etc.

A characteristic associated with the playback device 211 can be any characteristic of the playback device. The characteristic of the playback device can be any of the characteristics described above for a user device. The characteristic of the playback device can include a status of the playback device, for example with regard to any other playback devices that the playback device may be grouped with (e.g., a stereo pair, a synchrony group, etc.). The status of the playback device can also indicate whether the playback device is currently playing back media content and/or receiving media content for playback from any other device. For example, the characteristic can be an indication that the playback device is receiving media content for playback from any of the user devices 230, or from another device such as a remote computing device 106 (e.g., a media streaming service server). The characteristic can include an indication that the device is physically connected to other devices via a physical connection such as a line-in audio cable, etc.

The playback device can select a connection configuration based on any of the characteristics that is more suitable for the communication link. For example, an indication that the device is physically connected to another device may indicate that any other communication links established with the playback device may be established using a connection configuration that allows for a more temporary or lower priority communication link, so that those links can be interrupted/terminated if the playback device detects that media content is being received via the physical connection.

A characteristic associated with a context in which at least one of the playback device or the user device is operating can be any characteristic that characterizes a context in which the communication link is to be established, from the perspective of any of the devices involved in the communication link and/or other devices available for communication. For example, the characteristic can include a time, a date, a day of the week, whether the devices are in a known location (e.g., home WI-FI) or another location (hotel WI-FI), an activity that the devices are being used for (e.g., working out, meditating, etc.). The characteristic can also comprise a communication protocol that is being used or that is to be used for a given communication link. The characteristic can also be related to the purpose of the communication link. For example, the characteristic can include a type of data to be exchanged. In this way, certain devices/communication can be prioritized accordingly. For example, an alarm or a phone call could be prioritized over other data (e.g., music) in some instances.

The characteristic can also comprise data obtained or derived from third party applications (e.g., a third party application running on the user devices 230 or otherwise accessible to the playback device). For example, the playback device may have access to a calendar of a user. The calendar can be accessed from a calendar application running on a smartphone, or from an account associated with the playback device, or via any other mechanism. By accessing the calendar, the playback device can obtain data (a characteristic) that can be used to select an appropriate connection configuration. For example, if it is determined from the calendar (or other application associated with the playback device such as an e-mail application) that the user will be hosting a party from 6 pm to 10 pm on Saturday, any permanent connection previously established (e.g., with a fitness device) may be automatically changed to be configured with a different connection configuration that allows for establishment of communication links with other devices (e.g., a user smartphone or guest user devices) as it is more likely that the playback device may be used to play back music during the party than it is that the user is going to use the fitness device during the party. As another example, if it is determined (for example from a third party application or from user input), that the user works out in the morning before work, a more permanent or higher priority communication link can be established with the fitness equipment during that period of time so that when the user turns the fitness equipment on, the fitness equipment is automatically connected to the playback device for playback of media content and disconnected (or at least temporarily disconnected or otherwise prevented from playing back media content) from other devices.

As illustrated in FIG. 2, the playback device can include a device manager 210. The device manager 210 can be a software module/code (e.g., set of instructions) running on the playback device responsible for determining which device the playback device should receive media content from. The device manager 210 can be responsible for performing any functions related to the automatic and dynamic selection of devices for communication with the playback device. For example, the device manager 210 could be responsible for selecting a connection configuration suitable for a given communication link. The device manager 210 could be responsible for configuring the communication link in accordance with the connection configuration. The device manager 210 could be responsible for monitoring the occurrence of events that may affect the communication links and/or executing the instructions in the connection configurations in response to such events, etc. The device manager 210 can, in some instances, execute at least part of the methods described below with reference to FIGS. 3A through 6. In some instances, the device manager 210, or at least some of its functionalities, can be implemented by another device which is not the playback device 211 (for example, any other device in the media playback system 100, a controller device, a computing device working in association with the playback device, a combination of devices, etc.).

FIG. 3A illustrates an example flow diagram of example methods 300 of operation, in accordance with embodiments described herein. FIG. 3B illustrates an example schematic diagram 350 of example elements that could be involved in the execution of a method such as the method 300 in FIG. 3A, in accordance with embodiments described herein. When appropriate, illustrations in diagram 350 which represent an example execution of any of the blocks in method 300 have been represented to the right of such blocks. Any of the methods described in this disclosure can be executed by a playback device such as playback device 211 (for example by the device manager 210 executing instructions to perform the methods), and/or any other device (or combination of devices) such as any other device in the media playback system 100, a controller, a computing device operating in association with the media playback system, etc.

As illustrated in diagram 350, a user device, such as the smartphone 230a or any other user device, can be available for communication (as indicated by the broken line 352) with a playback device, such as playback device 211. In order to configure/handle a communication link between the two, the playback device can select a connection configuration in accordance with which the communication link can be established, as explained before in this disclosure.

Method 300 includes a block 304 of determining a first characteristic associated with at least one of: the user device, the playback device, or a context in which at least one of the playback device or the first device is operating. Example characteristics are given in the list 354 in diagram 350, but the characteristic can be any other characteristic such as any of the characteristics described elsewhere in this disclosure. In list 354, "PBD" refers to "playback device". Block 304 can include receiving at least one message from the user device comprising the characteristic and/or data that can be used to derive the characteristic. The message can be sent voluntarily by the user device when attempting to communicate or upon request by the playback device. The message can be sent as part of a handshake or advertising/scanning process that any of the devices can perform in order to start communicating with the other.

In some instances, block 304 can be executed after detecting that the user device was available for communication with the playback device via a wireless communications interface, as indicated in block 302. The playback device can detect devices available for communication in various ways. For example, depending on the communication protocol being used, devices can advertise themselves as available for communication and/or scan for other devices available for communication. For example, any of the playback device(s) and/or the user devices can be configured to broadcast at least one advertising message indicating that they are available for communication via a communications interface. In some instances, a connection request can be received by the device that broadcasted from a peer device after the broadcasting.

In some instances, the playback device can be configured to send at least one advertising message to a particular device indicating that the playback device is available for communication. The particular device can be a preferred device, a device to which the playback device was last connected, a device that the user is most likely to use at the given moment, or any other possibility. For example, the playback device could determine, using the set of connection configurations, that the particular device is likely to be the device that the user wanted to connect to the playback device at the time the playback device was turned on. As another example, the playback device could determine, using the set of connection configurations, that the particular device is a particular type of device, for example a device with which a communication link should be more permanent and/or take priority over others. After sending the at least one advertising message, the playback device could receive a connection request and/or acceptance from the first device.

In some instances, the playback device could attempt to communicate with a particular user device first, and if such device is not available, then the playback device can allow communications with other devices. For example, before broadcasting an advertising message indicating that it is available for communication, the playback device could send at least one first advertising signal to the particular device (e.g., preferred device). The advertising message can be broadcasted based on a determination that the particular device is not available for communication with the playback device. The playback device may continue to attempt communication with the preferred device even if communication with another device is established, so that the playback device can switch over to the preferred device when available.

Method 300 includes a block 306 of identifying a particular connection configuration in a set of connection configurations based on the first characteristic. As explained before, each connection configuration in the set of connection configurations can comprise at least one additional rule, in addition to any rule in the set of rules defined by the wireless communications protocol. As also explained before, each connection configuration can comprise instructions regarding the permanency and/or priority of the communication link to be established between the devices.

An example set of connection configurations 356 is illustrated in diagram 350. In this example, the characteristic determined in step 304 may be a characteristic of the user device 230a such as a type of device (e.g., smartphone, mobile device, etc.). Based on this determination, the playback device can be configured to identify (e.g., select from set 356) a connection configuration based on such a characteristic. For example, based on the fact that the user device is a mobile device likely to move around (e.g., in and out of a communication range of the playback device), and/or that it is battery operated, the playback device may decide to establish a communication link with such a user device that is temporary (or not permanent) at least in response to certain events. For example, the connection configuration can allow for the communication link to be terminated after a certain period of inactivity, which can be advantageous to save battery of the user device.

As another example, the connection configuration could allow for the communication link to be terminated (e.g., not automatically re-established) after communication with the user device has been lost. As another example, the connection configuration could comprise instructions to handle communication with other devices while the playback device is communicating with the user device 230a. For example, the connection configuration could comprise instructions to allow communication with the user device 230a to be terminated to establish communication with other devices that require a more permanent connection or have a higher priority at a given moment (e.g., if the playback device were part of a home theater set, as in the example described before in this disclosure). As another example, the connection configuration could comprise instructions to ignore, reject, or otherwise not to connect to other devices if it is indicated (e.g., by the connection configuration itself, a user input or in any other way) that the user device 230a is a preferred device over other devices. Many other examples are possible.

Method 300 includes a block 308 of establishing a communication link with the user device 230a, as illustrated with the double line 358 in diagram 350. As also explained before, the communication link can be established in accordance with a wireless communication protocol and the particular connection configuration. The communication link can then enable transmission of media content from the user device 230a for playback by the playback device.

In some instances, more than one user device may be available for communication with the playback device before the playback device makes any determination as to with what device to communicate. For example, when the playback device is turned on or otherwise ready for communicating with other devices (e.g., its BLUETOOTH is turned on), the playback device may detect, in block 302, one or more additional user devices available for communication with the playback device. In some instances, the playback device can determine, as part of block 304, one or more additional characteristics associated with at least one of: the one or more additional devices, the playback device, or a context in which at least one of the playback device or the second device is operating. The playback device can also identify one or more additional connection configurations in the set of connection configurations based on the additional characteristics. The playback device can then identify a device (e.g., the user device 230a) with which the first communication link is to be established among the various devices available, based on one or more of the multiple connection configurations.

In some instances, the characteristic can include an indication that the user device is a preferred device. In some instances, the fact that the device is a preferred device can be derived from another characteristic. For example, the payback device can receive from the user device and/or otherwise determine a device identifier, device name or other characteristic of the user device and be able to determine (e.g., from information accessible to the playback device such as user preferences stored in the playback device or otherwise accessible to it) that the device identifier is associated with a preferred device. The playback device may have stored and/or accessed a connection configuration for the preferred device. Such a connection configuration could cause the playback device to establish a link with the preferred device which is more permanent or has higher priority than other links. For example, the playback device may be configured (e.g., according to the connection configuration) to always attempt to communicate with the preferred device first before establishing communication links with any other devices. As another example, the playback device may be configured to automatically stop playback and/or terminate any other communication link with other devices whenever the preferred device is available for communication of media content, and switch over to receiving media content from the preferred device.

Figure 4B:
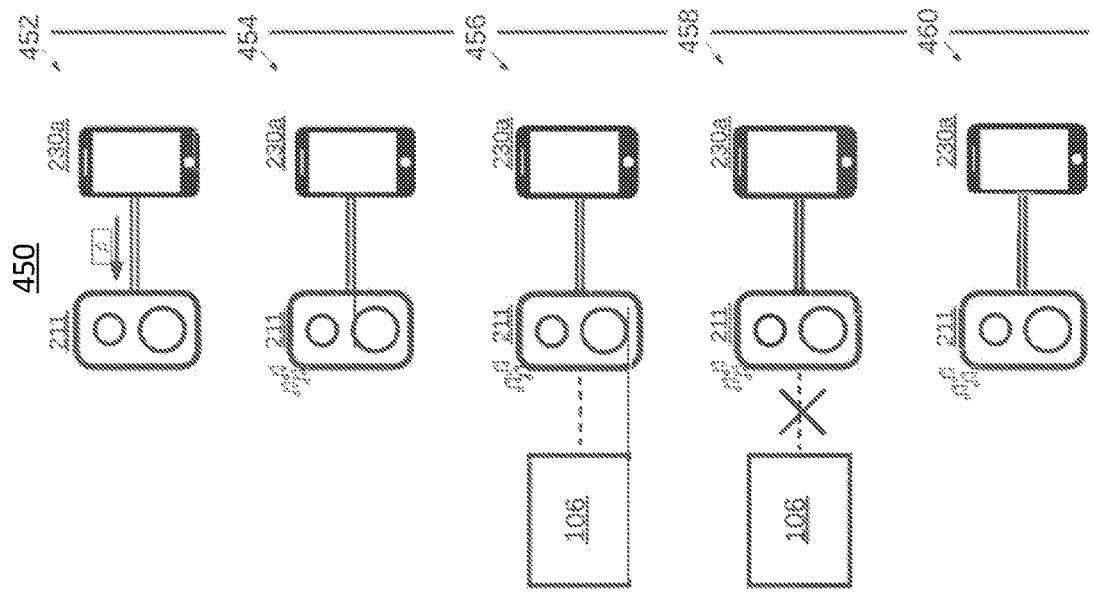
FIG. 4B illustrates an example schematic diagram of example elements that could be involved in the execution of the methods in FIG. 4A, in accordance with embodiments described herein.
Figure 4A:
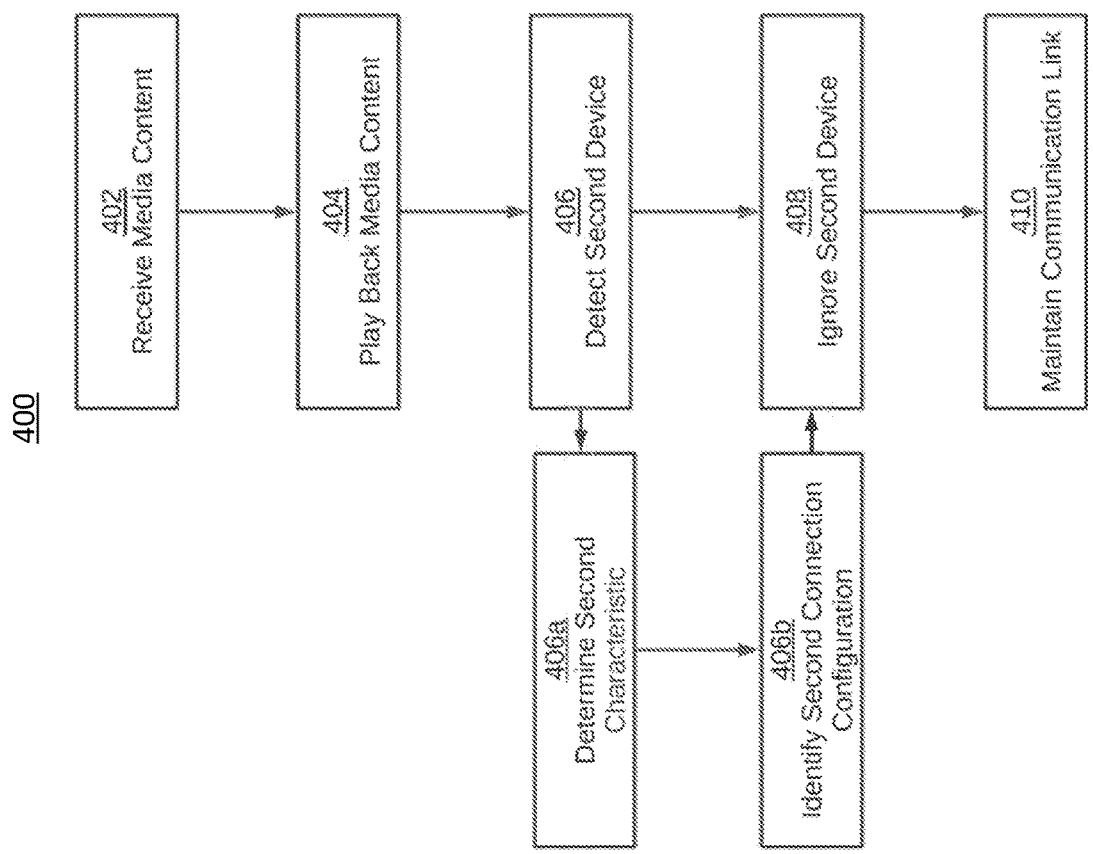
FIG. 4A illustrates an example flow diagram of example methods of operation for maintaining a communication link in presence of an additional device, in accordance with embodiments described herein.

FIG. 4A illustrates an example flow diagram 400 of example methods of operation for maintaining a communication link in presence of an additional device, in accordance with embodiments described herein. FIG. 4B illustrates an example schematic diagram 450 of example elements that could be involved in the execution of the methods in FIG. 4A, in accordance with embodiments described herein. When appropriate, illustrations in diagram 450 which represent an example execution of any of the blocks in method 400 have been represented to the right of such blocks.

Method 400 can be executed after having established a communication link with a first user device, such as user device 230a, for example as described with reference to FIGS. 3A and 3B. Method 400 includes an optional block 402 of receiving, from the first device, media content for playback by the playback device and an optional block 404 of playing back the media content, as represented to the right in illustrations 452 and 454 of diagram 450. Method 400 includes a block 406 of detecting a second device available for communication with the playback device. For example, and as represented to the right in illustration 456, a second user device such as a computing device 106 may be available for communication with the playback device 211, as illustrated in diagram 450. Block 406 can be performed while media content is being played back by the playback device, but not necessarily.

In some instances, the playback device may be configured to ignore the second device and maintain the first communication link with the first device, as indicated by blocks 408 and 410 of method 400 and represented to the right in illustrations 458 and 460. The decision to ignore the second device 106 may be made based on the particular connection configuration in accordance with which the link with the first user device 230a was established. For example, such a connection configuration may indicate and/or comprise instructions so that the communication link with user device 230a persists and/or has higher priority over other communication links/devices. The connection configuration could comprise instructions to ignore any device while a communication link with the first device is established, or to ignore specifically device 106, or a type of device to which it pertains (e.g., music streaming services), or a communication protocol being used, or any other condition. In some instances, ignoring the second device comprises rejecting any request for communication received by the second device 106. For example, in one example, ignoring the second device comprises sending a rejection message to the second device, thereby rejecting the second device. In other instances, ignoring the second device comprises simply not engaging in any communication aiming transmission of media content for playback.

In some instances, the playback device can be configured to, after detecting that the second device is available for communication in block 406, determine a second characteristic associated with at least one of: the user device, the playback device, or a context in which at least one of the playback device or the first device is operating, as indicated in block 406a. Block 406a can be performed in the same or similar way as block 304 in method 300. In some instances, the playback device may be further configured to identify a second connection configuration in the set of connection configurations, the second connection associated with the second characteristic, as indicated in block 406b. In those instances, blocks 408 and 410 of ignoring the second device and maintaining the communication link with the first user device can be performed based on any or both the first connection configuration (as in the previous example) and/or the second connection configuration. For example, the playback device may be configured to determine a characteristic and associated connection configuration for the second device to determine whether the second device should take priority over the first one (e.g., based on a priority level or instructions in any of the first and/or second connection configurations).

In some instances, the playback device may be configured to analyze a level of priority and either terminate a communication link when an alternative communication link has a higher level of priority, or maintain the communication link when the alternative communication link has an equal or lower priority level.

One practical example of the method described above is for example if the payback device 110 is currently communicating with its preferred device (e.g., 230a) via a first communication protocol/interface such as BLUETOOTH. Playback device 211 could detect that another device is available for communication. For example, a computing device (e.g., 106) can be available to send media content for playback by playback device 211 over another communication protocol/interface such as WI-FI. The computing device 106 (or any other device) may be available to send media content for playback to the playback device when such devices have media content available for playback (e.g., media content from an application, from a local or remote queue of media items, from a local or remote source of media content, etc.).

In the specific example of the computing device 106, for example, the computing device could be a media service provider server configured to provide media content for playback by the media playback system 100. The computing device 106 could provide media content upon receiving a request. For example a user could request media content for playback from any of the playback devices in system 100, a controller device, any of the user devices 230, etc. However, the playback device may be able to determine from any of the first and/or second connection configurations that the first user device (or the first communication protocol) has higher priority than the second device/protocol, and/or that the first communication link should persist among the two.

In some instances, contrary to the examples described above with reference to FIGS. 4A and 4B, the playback device can be configured (e.g., based on one or more connection configurations) to terminate the communication link with the first device in view of the second device available for communication. Examples of these instances are described with reference to FIGS. 5A and 5B.

Figure 5B:
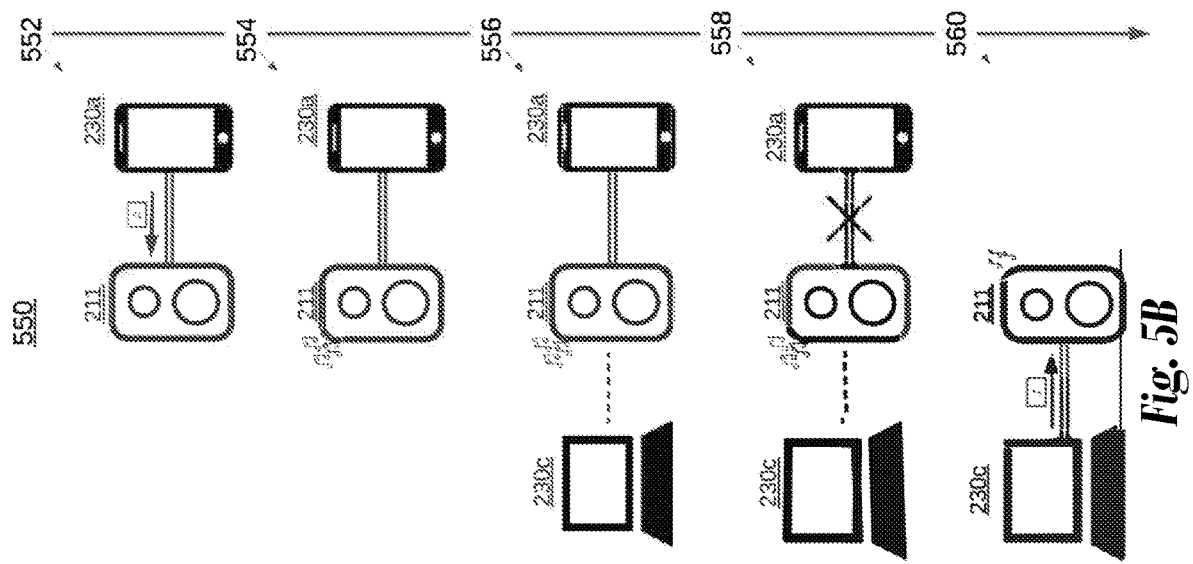
FIG. 5B illustrates an example schematic diagram of example elements that could be involved in the execution of the methods in FIG. 5A, in accordance with embodiments described herein.
Figure 5A:
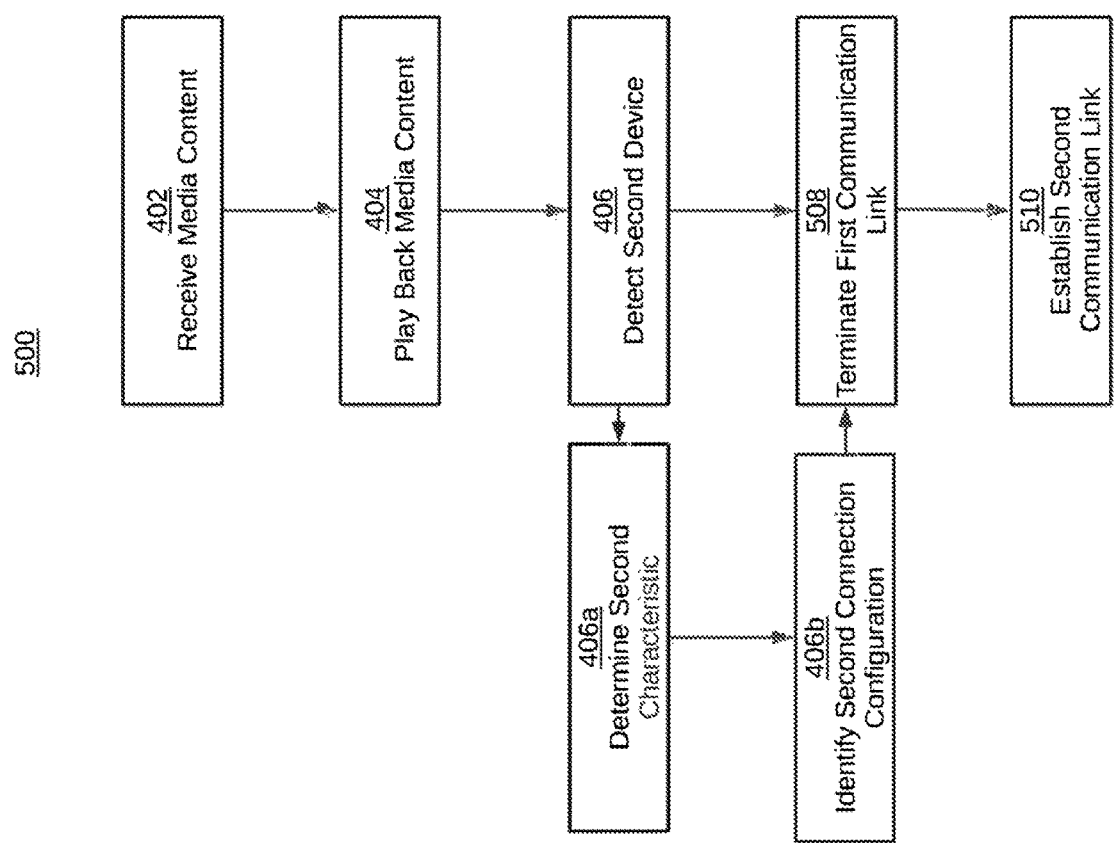
FIG. 5A illustrates an example flow diagram of example methods of operation for establishing a communication link with an additional device, in accordance with embodiments described herein.

FIG. 5A illustrates an example flow diagram 500 of example methods of operation for establishing a communication link with an additional device, in accordance with embodiments described herein. FIG. 5B illustrates an example schematic diagram 550 of example elements that could be involved in the execution of the methods in FIG. 5A, in accordance with embodiments described herein. When appropriate, illustrations in diagram 550 which represent an example execution of any of the blocks in method 500 have been represented to the right of such blocks.

Method 500 includes blocks 402-406 (described with reference to FIG. 4A) of, after establishing the first communication link with the first device, receive, from the first device, media content for playback by the playback device; playing back the media content; and (alternatively while playing back the media content) detect a second device available for communication with the playback device via the communications interface. However, in method 500, the playback device can be configured (e.g., based on the connection configuration of the communication link with the first device) to terminate the first communication link with the first device (block 508) and establish a second communication link with the second device (block 510).

In some instances, the second communication link can be established via the same communication interface/protocol as the first communication link. For example, the playback device can be first communicating with the first user device and then with the second user device via BLUETOOTH. In some instances, the second communication link can be established via a different communication interface/protocol than the first communication link. For example, the playback device can be first communicating with the first user device via WI-FI and then with the first user device via BLUETOOTH. Other examples are possible.

The decision of terminating the communication link with the first device to start a communication link with the second one can be made based on the connection configuration in accordance with which the first communication link was established. For example, the connection configuration can comprise instructions that cause the playback device to terminate the communication link when another device is available for communication of media content. In some instances, the first communication link can be a temporary or low priority link (e.g., in accordance with the connection configuration), and such configuration can allow and/or cause the playback device to switch over to a different device when available.

The second communication link can be established in accordance with a second connection configuration. Similarly to what has been described for other examples, the second connection configuration can be selected based on a second characteristic associated with at least one of: the second device, the playback device, or a context in which at least one of the playback device or the second device is operating.

As illustrated in FIG. 5A, method 500 can include blocks 406a and 406b described with reference to FIG. 4A, of determining a second characteristic associated with at least one of: the second device, the playback device, or a context in which at least one of the playback device or the second device is operating, and identifying a second connection configuration in the set of connection configurations based on the second characteristic. As explained before, these actions can occur after detecting that the second device is available for communication with the playback device.

In some instances, the decision of terminating the communication link with the first device (block 508) and establishing a communication link with the second device (block 510) can be based on any or both the first connection configuration (as in the previous example) and/or the second connection configuration. For example, the playback device may be configured to determine a characteristic (block 406a) and associated connection configuration (block 406b) for the second device to determine whether the second device should take priority over the first one (e.g., based on a priority level or instructions in any of the first and/or second connection configurations).

A practical example is illustrated in the diagram 550. As represented in illustration 552, the playback device 211 may be communicating with the first user device 230a. The playback device may be receiving media content from the user device and playing back such media content, as represented in illustration 554. At some point the playback device could detect a second user device (notebook 230c) available for communication with the playback device, as represented in illustration 556. For example, the notebook 230c may have been turned on. At this point, the playback device could refer to the instructions in the connection configuration and act accordingly. For example, the playback device may determine that the first user device 230a is a preferred device and therefore ignore any other device available for communication, as in the examples described with reference to FIG. 4B. As another example, the playback device 211 could determine that the communication link with the first playback device 230a is temporary or low priority, or that the connection configuration allows for other devices to take over the playback device for playback of media content.

In the example of diagram 550, the playback device could determine a characteristic of the second user device, for example a type of device. By determining that the second device is a notebook, the playback device can make the decision as to whether to switch over to the second device. For example, the connection configuration in accordance with which the first communication link with user device 230a was established may indicate that the communication link should not be terminated in view of some devices, but can be terminated in view of other devices (for example a preferred device, a type of device, etc.). For example, the connection configuration can comprise instructions that cause the playback device to terminate the communication link with the first device 230a and switch over to the second device 230c based on the fact that the second device is a computer, as represented in illustrations 558 and 560. In some instances, it can be desirable to have a more permanent connection with a computer than with a smartphone. In this case, if the user desired to use the playback device as the computer speaker, the playback device can automatically switch over and be ready to be used to play back content from the computer rather than other devices.

The playback device could identify a connection configuration appropriate for a communication link with device 230c and configure the communication link in accordance with such a connection configuration. In some instances, the playback device can make the determination to switch over to the second device (blocks 508 and 510) based on the connection configuration identified for the second device. For example, the playback device could perform blocks 406a and 406b and determine, based on the identified connection configuration, that the second user device (and/or the communication link to be established with it) has a higher priority than the first user device (and/or communication link already established with it). The playback device could then decide to switch over to the second device based on the connection(s) configuration(s), which can be in the form of (or comprise) instructions that cause the playback device to execute blocks 508 and 510.

As mentioned previously, methods 400 and 500 can be optionally executed while the playback device is already receiving media content for playback from a first device. In some instances, the decision of whether to ignore a second device (as in method 400) and/or establish a communication link with it (as in method 500) may need to be made only when the playback device is already playing back content. In this way, for example, if the playback device is not playing anything, any device could be able to transmit media content for playback. However, in some instances, even if the playback device is not playing back any media content, depending on a connection configuration under which a current link was established, the playback device may have to decide whether to allow another device to transmit media content for playback. For example, if the playback device is used as a computer speaker, it may not necessarily be playing back media content continuously. Regardless, it may be interesting to ignore other devices and keep the communication link with the computer so that any sound, even if occasional (e.g., notifications) can be played back by the playback device.

Figure 6:
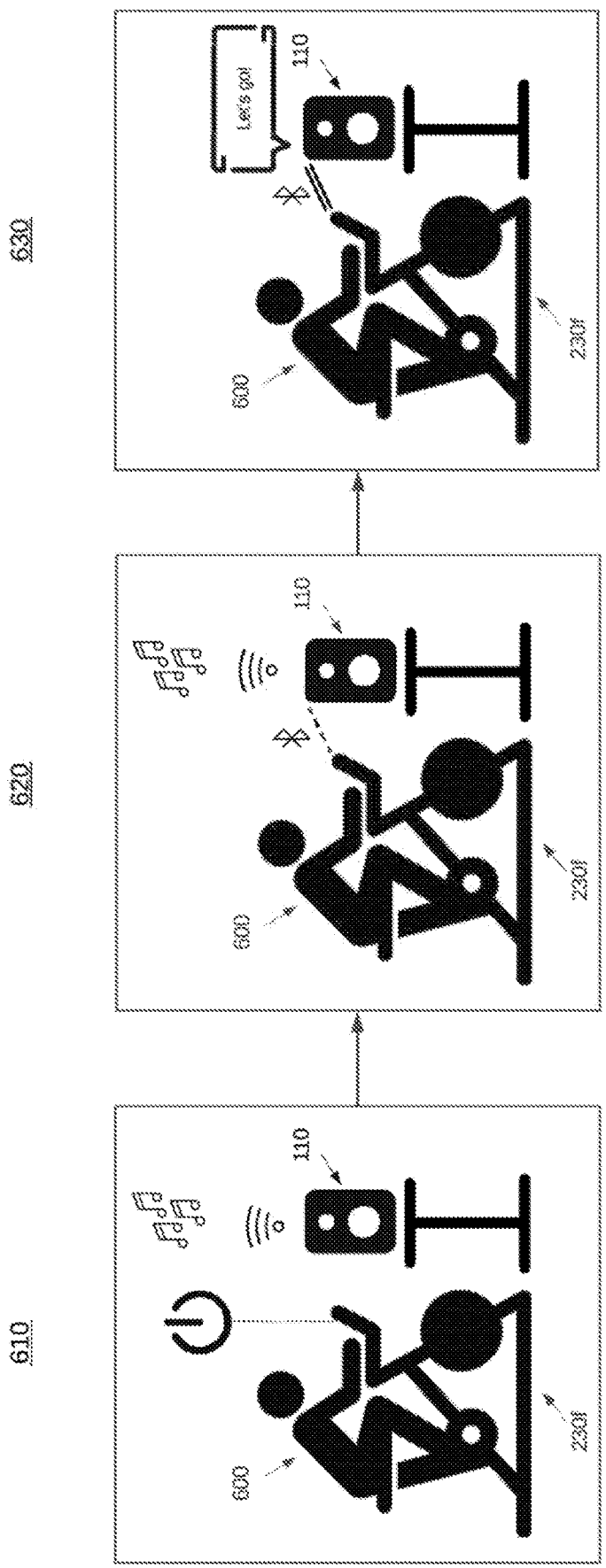
FIG. 6 illustrates a schematic diagram of an example scenario in which any of the methods described with reference to FIGS. 3A through 5A can be implemented, in accordance with embodiments described herein.

FIG. 6 includes schematic diagram of an example scenario in which any of the methods described with reference to FIGS. 3A through 5B can be implemented. The scenario in FIG. 6 includes the playback device 110 and at least one user device, the bike 230f. In a first instance 610, the playback device can be available for communication with any user device and/or actively receiving/playing back media content from any device. For example, the playback device can be playing back media content received via a WI-FI network, from any other device such as a computing device 106. A user 600 has turned on the user device 230f, for example in preparation to start a workout. The user 600 may or may not be the same user that started playback of the media content that is currently playing at playback device 211.

In instance 620, the playback device detects that user device 230f is available for transmission of media content for playback. At this point, the user device 230f could be automatically connected to the playback device for audio transmission. The illustrated example illustrates the user device connecting to the playback device over BLUETOOTH, but any other communication protocol could be used as long as both the user device and the playback device support it and as long as it enables transmission/reception of media content. In instance 630, the user has started their workout program. At this point, the playback device may stop playback of any audio being received from other devices (e.g., via WI-FI) and switch over to the workout audio from the user device 230f.

User device 230f can be automatically connected to the playback device based on the connection configurations explained elsewhere in this disclosure. In this case, a connection configuration can include instructions to cause the playback device to prioritize the connection with the user device 230f, for example based on the fact that it is a fitness device that the user will most likely be using to work out and the workout audio or media content should be prioritized. This implementation could vary in many ways such as based on user preferences and personalization, or based on context such as a time in which the user usually works out, etc. For example, the user device 230f can be a preferred device from 6 am to 7 am, but not during the rest of the day. Other examples are possible.

As illustrated in instance 610, before detecting that the user device 230f is available for communication with the playback device, the playback device can be configured to receive media content for playback from other devices. Media content from other devices can be received via the same or a different wireless communication interface configured to facilitate communication with other devices via different communication protocol. In some instances, before detecting that the user device is available for communication with the playback device, the playback device is associated with another device so that the playback device is configured to receive media content for playback from another device.

In any case, establishing a communication link with the user device 230f (via the same or different communication interface) could cause the playback device to be configured to receive media content for playback from the user device 230f via the communication link. In some instances, before detecting that the user device 230f is available for communication with the playback device, the playback device may be receiving media content for playback from another device. In this case, establishing the first communication link with the user device would cause the playback device to stop playing back the media content from the other device. In some instances, establishing the communication link with the user device 230f could also cause the playback device to start playing back media content received from the other device.

In some instances, the playback device can be associated with, connected to, or in a communication link with different devices in different ways and/or via different interfaces/protocols. For example, the playback device can be associated with a device via a wireless communication interface configured to facilitate communication with other devices via a first communication protocol (e.g., WI-FI) and switch over to be associated with another device via a wireless communication interface configured to facilitate communication with other devices via another communication protocol (e.g., BLUETOOTH).

Figure 7:
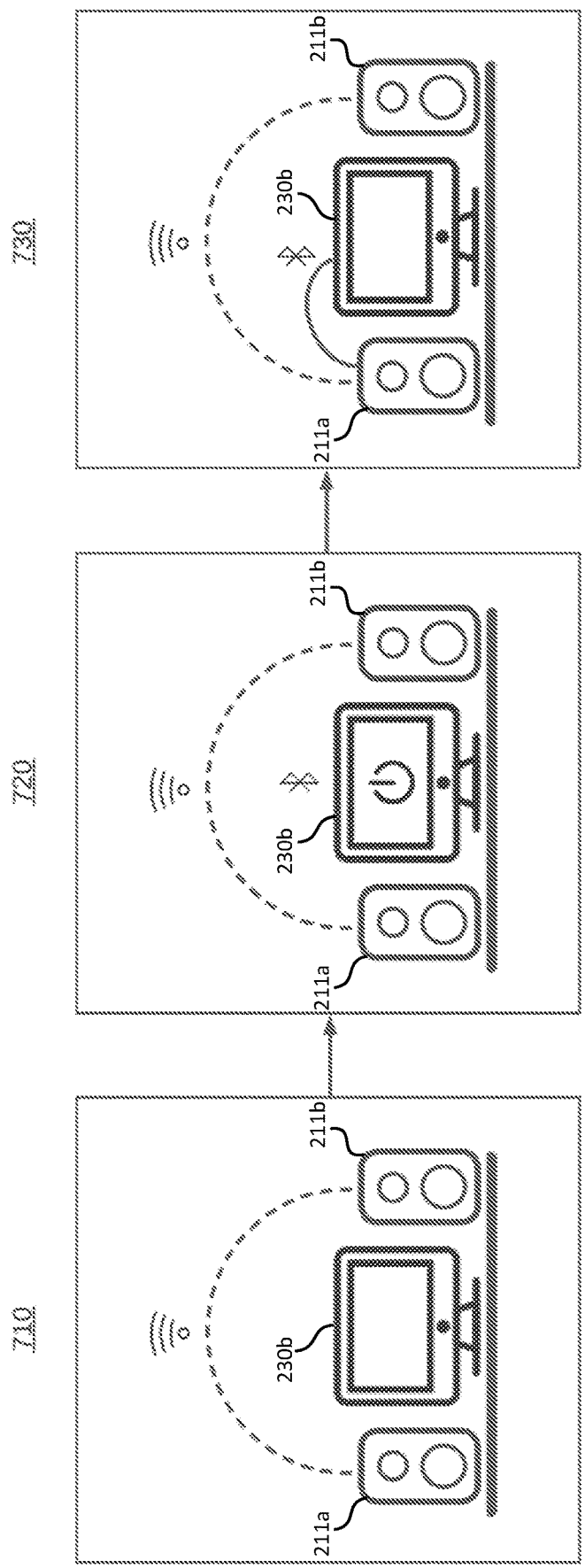
FIG. 7 illustrates a schematic diagram of an example scenario in which any of the methods described with reference to FIGS. 3A through 5A can be implemented where the playback device is part of a group formed by at least one other playback device, in accordance with embodiments described herein.

In some instances, the playback device could be configured to operate in association with one or more other playback devices. For example, the playback device may be part of a group, a stereo pair, a home theater set, etc. FIG. 7 includes a schematic diagram of an example scenario in which a first playback device 211a is part of a group formed by at least one second playback device 211b. The two playback devices can be operating, for example, as a stereo pair.

The stereo pair (or other grouping) can be formed so that the two devices receive media content and exchange data related to the group via a communication protocol such as WI-FI. Instance 710 illustrates the two playback devices bonded via WI-FI. The two devices can be used as speakers of a user device such as computer 230b. When the user device 230b is not in use, the two playback devices can be used to play back any media content from any device. However, as soon as the user device 230b is turned on (instance 720) and becomes available for communication with the playback devices, at least one of the playback devices can be configured to automatically connect to the user device.

This automatic configuration can be accomplished via the use of connection configurations described elsewhere in this disclosure. For example, the playback device may determine a characteristic of the user device 230b such as a device ID, device name, device type, or other, and determine, based on a connection configuration, that a higher priority or more permanent link should be established with such a user device. For example, the playback device may determine that a link of certain priority or permanency should be established with the user device because the user device is a computer or stationary device rather than a mobile device, or because the user device 230b is a preferred device, or because a user of the playback device has set up the connection configuration to cause the device to behave in this way.

As illustrated in instance 730, the user device 230b and the at least one playback device can communicate via BLUETOOTH or other communication protocol. In some instances, the grouping of playback devices can be maintained even if one of the playback devices is connected to the user device. As in the example illustrated in instance 730, the user device can communicate with at least one of the playback devices via a communication protocol, and the playback devices in the group can communicate via the same or a different protocol. In this way, any media content transmitted to at least one of the playback devices in the group can be played back by the group.

As illustrated in the previous example, before detecting that the user device is available for communication with the playback device, the playback device can be configured to play back media content together with a second playback device (or more playback devices). The playback devices can be connected via any communication link. Establishing a communication link with the user device can cause the playback device to be configured to receive media content for playback from the user device via a communication link and send at least a portion of the media content to the other playback devices via another communication link. In some instances, the various playback devices can be configured to play back the media content in synchrony. In some instances, the various playback devices can be configured to play back different channels of the media content. For instance, in some examples, the first playback device is configured to play back a first channel of the media content, and the second playback device is configured to play back a second channel of the media content.

Although various specific examples have been given as a way of explaining potential implementations of the concepts described in this disclosure, the given examples do not define or otherwise limit the scope of the disclosure. The idea of storing multiple connection configurations that define at least one aspect of communication links that can be established between a playback device and other devices, and selecting one of those connection configurations based on some contextual information (e.g., the characteristic described before in this disclosure), can be broadly applicable to any scenario, regardless of the specific aspect that the connection configuration defines and/or the contextual information used for selecting such a connection configuration. Furthermore, the idea of selecting one device among a plurality of devices from which to receive media content from and the subsequent decision as to whether other devices should or should not be allowed to take over transmission of media content based on contextual information can also be broadly applicable to any other scenario.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

V. Examples

The following examples pertain to further embodiments, from which numerous permutations and configurations will be apparent.

(Example 1) A playback device comprising: a wireless communications interface configured to facilitate communications with other devices via at least one wireless communication protocol, wherein the at least one wireless communication protocol defines a set of rules for the communications; at least one processor; and at least one non-transitory computer-readable medium comprising program instructions that are executable by the at least one processor such that the playback device is configured to: after detecting a first device available for communication with the playback device via the wireless communications interface, determine a first characteristic associated with at least one of: the first device, the playback device, or a context in which at least one of the playback device or the first device is operating; identify a particular connection configuration in a set of connection configurations based on the first characteristic, wherein each connection configuration in the set of connection configurations comprises at least one additional rule, in addition to any rule in the set of rules defined by the at least one wireless communication protocol; and establish a first communication link with the first device via the wireless communications interface in accordance with the at least one wireless communication protocol and the particular connection configuration, wherein the first communication link enables transmission of media content from the first device for playback by the playback device.

(Example 2) The playback device of Example 1, wherein the at least one wireless communication protocol comprises BLUETOOTH, WI-FI, ZIGBEE, NFC (Near Field Communication), SIGFOX, LORAWAN, Z-WAVE, OPC UA, Cellular, or MQTT.

(Example 3) The playback device of either Example 1 or Example 2, wherein the first characteristic comprises one or more of: a device identifier of the first device; a type of device of the first device; a status of the first device; a status of the playback device; a purpose of the communications; a type of data to be exchanged; a time; a location; or data from a third-party application.

(Example 4) The playback device of any of Examples 1-3, wherein the at least one additional rule in the particular connection configuration comprises a rule for handling permanency of the first communication link in response to at least one event.

(Example 5) The playback device of Example 4, wherein the at least one event comprises detecting that no media content is being transmitted over the first communication link.

(Example 6) The playback device of Example 5, wherein the at least one additional rule comprises maintaining the first communication link when no media content is being transmitted over the first communication link.

(Example 7) The playback device of either Example 5 or Example 6, wherein: the particular connection configuration comprises a duration of time after which the first communication link is to be terminated when no media content is being transmitted over the first communication link; and the at least one additional rule comprises terminating the first communication link after the duration of time.

(Example 8) The playback device of Example 7, wherein: the first characteristic comprises a type of device associated with the first device; and the duration of time depends on the type of device.

(Example 9) The playback device of any of Examples 4-8, wherein the at least one event comprises detecting an alternative communication link that enables transmission of alternative media content from an alternative device for playback by the playback device.

(Example 10) The playback device of Example 9, wherein the at least one additional rule includes a rule for handling coexistence between the first communication link and the alternative communication link.

(Example 11) The playback device of either Example 9 or Example 10, wherein: the alternative communication link is established via an alternative communication protocol; and the particular connection configuration defines a priority level for the at least one wireless communication protocol with respect to the alternative communication protocol.

(Example 12) The playback device of any of Examples 9-11, wherein the at least one additional rule comprises at least one of: terminating the first communication link when the alternative communication link has a higher priority level; or maintaining the first communication link when the alternative communication link has an equal or lower priority level.

(Example 13) The playback device of any of Examples 1-12, wherein the particular connection configuration comprises a rule for handling a second communication link that enables transmission of second media content from a second device for playback by the playback device while the first communication link is established.

(Example 14) The playback device of any of Examples 1-13, wherein the particular connection configuration comprises a rule for handling termination of the first communication link when no media content is being transmitted over the first communication link.

(Example 15) The playback device of any of Examples 1-14, wherein the particular connection configuration comprises a rule that establishes a level of priority of the first communication link with respect to other communication links that enable transmission of media content for playback by the playback device.

(Example 16) The playback device of any of Examples 1-15, wherein identifying the particular connection configuration in the set of connection configurations comprises: determining that a connection configuration associated with the first characteristic is not available; and generating the particular connection configuration.

(Example 17) The playback device of Example 16, wherein generating the particular connection configuration comprises: receiving an input indicating at least one aspect of the particular connection configuration via a user interface associated with the playback device; and storing the at least one aspect of the particular connection configuration in association with the first characteristic.

(Example 18) The playback device of Example 17, wherein the input indicates that the first device is a preferred device.

(Example 19) The playback device of any of Examples 1-18, wherein the at least one non-transitory computer-readable medium further comprises program instructions such that the playback device is configured to: after establishing the first communication link with the first device, receive, from the first device, media content for playback by the playback device; and while playing back the media content: detect a second device available for communication with the playback device via the wireless communications interface; and based on the particular connection configuration, ignore the second device and maintain the first communication link with the first device.

(Example 20) The playback device of Example 19, wherein ignoring the second device comprises sending a rejection message to the second device rejecting the second device.

(Example 21) The playback device of any of Examples 1-20, wherein the at least one non-transitory computer-readable medium further comprises program instructions such that the playback device is configured to: after establishing the first communication link with the first device, receive, from the first device, media content for playback by the playback device; and while playing back the media content: detect a second device available for communication with the playback device via the wireless communications interface; determine a second characteristic associated with at least one of: the second device, the playback device, or a context in which at least one of the playback device or the second device is operating; identify an alternative connection configuration in the set of connection configurations, the alternative connection configuration associated with the second characteristic; and based on at least one of the particular connection configuration and the alternative connection configuration, ignore the second device and maintain the first communication link with the first device.

(Example 22) The playback device of any of Examples 1-21, wherein the at least one non-transitory computer-readable medium further comprises program instructions such that the playback device is configured to: after establishing the first communication link with the first device, receive, from the first device, media content for playback by the playback device; and while playing back the media content: detect a second device available for communication with the playback device via the wireless communications interface; and based on the particular connection configuration: (i) terminate the first communication link with the first device; and (ii) establish a second communication link with the second device via the wireless communications interface.

(Example 23) The playback device of Example 22, wherein the second communication link is established in accordance with an alternative connection configuration.

(Example 24) The playback device of Example 23, wherein the alternative connection configuration is selected based on a second characteristic associated with at least one of: the second device, the playback device, or a context in which at least one of the playback device or the second device is operating.

(Example 25) The playback device of any of Examples 1-24, wherein the at least one non-transitory computer-readable medium further comprises program instructions such that the playback device is configured to: after establishing the first communication link with the first device, receive, from the first device, media content for playback by the playback device; and while playing back the media content: detect a second device available for communication with the playback device via the wireless communications interface; determine a second characteristic associated with at least one of: the second device, the playback device, or a context in which at least one of the playback device or the second device is operating; identify an alternative connection configuration in the set of connection configurations, the alternative connection configuration associated with the second characteristic; and based on the alternative connection configuration: (i) terminate the first communication link with the first device; and (ii) establish a second communication link with the second device via the wireless communications interface, in accordance with the alternative connection configuration.

(Example 26) The playback device of any of Examples 1-25, wherein: before detecting that the first device is available for communication with the playback device via the wireless communications interface, the playback device is configured to receive first media content for playback via an alternative wireless communication interface configured to facilitate communication with other devices via at least one alternative communication protocol; and establishing the first communication link with the first device via the wireless communications interface causes the playback device to be configured to receive second media content for playback from the first device via the first communication link.

(Example 27) The playback device of any of Examples 1-26, wherein: before detecting that the first device is available for communication with the playback device via the wireless communications interface, the playback device is associated with a second device so that the playback device is configured to receive second media content for playback from the second device; and establishing the first communication link with the first device via the wireless communications interface causes the playback device to be configured to receive first media content for playback from the first device via the first communication link.

(Example 28) The playback device of Example 27, wherein: before detecting that the first device is available for communication with the playback device via the wireless communications interface, the playback device is receiving the second media content for playback from the second device; and establishing the first communication link with the first device via the wireless communications interface causes the playback device to stop playing back the second media content.

(Example 29) The playback device of either Example 27 or Example 28, wherein establishing the first communication link with the first device via the wireless communication interface further causes the playback device to start playing back the first media content received from the first device.

(Example 30) The playback device of any of Examples 27-29, wherein the playback device is associated with the second device via an alternative wireless communication interface configured to facilitate communication with other devices via at least one alternative communication protocol.

(Example 31) The playback device of Example 30, wherein: the at least one wireless communication protocol is BLUETOOTH; and the at least one alternative communication protocol is WI-FI.

(Example 32) The playback device of any of Examples 1-31, wherein: the playback device is a first playback device; before detecting that the first device is available for communication with the first playback device via the wireless communications interface, the first playback device is configured to playback media content together with a second playback device, wherein the first playback device and the second playback device are connected via a second communication link; and establishing the first communication link with the first device via the wireless communications interface causes the first playback device to be configured to: receive media content for playback from the first device via the first communication link; and send at least a portion of the media content to the second playback device via the second communication link.

(Example 33) The playback device of Example 32, wherein the first playback device and the second playback device are configured to play back the media content in synchrony.

(Example 34) The playback device of either Example 32 or Example 33, wherein: the first playback device is configured to play back a first channel of the media content; and the second playback device is configured to play back a second channel of the media content, wherein the second channel is different from the first channel.

(Example 35) The playback device of any of Examples 32-34, wherein the second communication link between the first playback device and the second playback device is established via an alternative wireless communication interface configured to facilitate communication with other devices via at least one alternative communication protocol.

(Example 36) The playback device of Example 35, wherein: the at least one wireless communication protocol is BLUETOOTH; and the at least one alternative communication protocol is WI-FI.

(Example 37) A playback device comprising: a wireless communications interface; at least one processor; and at least one non-transitory computer-readable medium comprising program instructions that are executable by the at least one processor such that the playback device is configured to: detect a first device available for communication with the playback device via the wireless communications interface; determine a first characteristic associated with at least one of: the first device, the playback device, or a context in which at least one of the playback device or the first device is operating; select a particular set of rules from a plurality of sets of rules based at least in part on the determined first characteristic, wherein each set of rules in the plurality of sets of rules govern at least one connection handling behavior; and establish a first communication link with the first device via the wireless communications interface in accordance with the particular set of rules, wherein the first communication link enables transmission of media content from the first device for playback by the playback device.

(Example 38) The playback device of Example 37, wherein the at least one connection handling behavior comprises permanency of the first communication link when no media content is being transmitted over the first communication link.

(Example 39) The playback device of either Example 37 or Example 38, wherein the at least one connection handling behavior comprises permanency of the first communication link when an alternative communication link which enables transmission of alternative media content for playback by the playback device is established.

(Example 40) A playback device comprising: a wireless communications interface configured to facilitate communications with other devices via at least one wireless communication protocol; at least one processor; and at least one non-transitory computer-readable medium comprising program instructions that are executable by the at least one processor such that the playback device is configured to: detect a first device available for communication with the playback device via the wireless communications interface; determine a first characteristic associated with at least one of: the first device, the playback device, or a context in which at least one of the playback device or the first device is operating; select a particular configuration in a set of configurations based at least in part on the determined first characteristic, wherein each configuration in the set of configurations comprises a value for at least one parameter required by the at least one wireless communication protocol; and establish a first communication link with the first device via the wireless communications interface in accordance with the particular configuration, wherein the first communication link enables transmission of media content from the first device for playback by the playback device.

(Example 41) The playback device of Example 40, wherein: the at least one wireless communication protocol comprises BLUETOOTH; and the at least one parameter comprises a Link_Supervision_Timeout parameter.

(Example 42) The playback device of any of Examples 1-41, wherein before establishing the first communication link with the first device, the playback device is configured to: detect a second device available for communication with the playback device via the wireless communications interface; determine a second characteristic associated with at least one of: the second device, the playback device, or a context in which at least one of the playback device or the second device is operating; identify an alternative configuration in the set of configurations, the alternative configuration based on the second characteristic; and based on the particular configuration and the alternative configuration, identify the first device as a device with which the first communication link is to be established.

(Example 43) The playback device of any of Examples 1-42, wherein detecting that the first device is available for communication with the playback device via the wireless communications interface comprises: broadcasting at least one advertising message indicating that the playback device is available for communication via the wireless communications interface; and after broadcasting the at least one advertising message, receiving a connection request from the first device.

(Example 44) The playback device of any of Examples 1-43, wherein detecting that the first device is available for communication with the playback device via the wireless communications interface comprises: sending at least one advertising message to the first device indicating that the playback device is available for communication via the wireless communications interface; and after sending the at least one advertising message, receiving a connection request from the first device.

(Example 45) The playback device of Example 44, wherein sending the at least one advertising message to the first device comprises determining, using the set of configurations, that the first device is a preferred device.

(Example 46) The playback device of ether Example 44 or Example 45, wherein sending the at least one advertising message to the first device comprises determining, using the set of configurations, that the first device is a particular type of device.

(Example 47) The playback device of any of Examples 44-46, wherein sending the at least one advertising message to the first device comprises determining that the first device is a past device to which the playback device was last connected via the wireless communications interface.

(Example 48) The playback device of any of Examples 44-47, wherein the at least one non-transitory computer-readable medium further comprises program instructions such that the playback device is configured to: before broadcasting the at least one advertising message indicating that the playback device is available for communication via the wireless communications interface, sending at least one first advertising signal to a second device, wherein a configuration associated with the second device indicates that the second device is a preferred device; and wherein the at least one advertising message is broadcasted based on a determination that the second device is not available for communication with the playback device via the wireless communications interface.

(Example 49) The playback device of any of Examples 44-48, wherein detecting that the first device is available for communication with the playback device via the wireless communications interface comprises receiving one or more alternative advertising messages from the first device.

What is claimed is:

1. A playback device comprising:
a wireless communications interface configured to facilitate communications with other devices via at least one wireless communication protocol, wherein the at least one wireless communication protocol defines a set of rules for the communications;
at least one processor; and
at least one non-transitory computer-readable medium comprising program instructions that are executable by the at least one processor such that the playback device is configured to:
after detecting a first device available for communication with the playback device via the wireless communications interface, determine a first characteristic associated with at least one of: the first device, the playback device, or a context in which at least one of the playback device or the first device is operating;
identify a particular connection configuration in a set of connection configurations based on the first characteristic, wherein each connection configuration in the set of connection configurations comprises at least one additional rule, in addition to any rule in the set of rules defined by the at least one wireless communication protocol; and
establish a first communication link with the first device via the wireless communications interface in accordance with the at least one wireless communication protocol and the particular connection configuration, wherein the first communication link enables transmission of media content from the first device for playback by the playback device.

2. The playback device of claim 1, wherein the first characteristic comprises one or more of: a device identifier of the first device; a type of device of the first device; a status of the first device; a status of the playback device; a purpose of the communications; a type of data to be exchanged; a time; a location; or data from a third-party application.

3. The playback device of claim 1, wherein the particular connection configuration comprises a rule for handling a second communication link that enables transmission of second media content from a second device for playback by the playback device while the first communication link is established.

4. The playback device of claim 1, wherein the particular connection configuration comprises a rule for handling termination of the first communication link when no media content is being transmitted over the first communication link.

5. The playback device of claim 1, wherein the particular connection configuration comprises a rule that establishes a level of priority of the first communication link with respect to other communication links that enable transmission of media content for playback by the playback device.

6. The playback device of claim 1, wherein identifying the particular connection configuration in the set of connection configurations comprises:
determining that a connection configuration associated with the first characteristic is not available; and
generating the particular connection configuration.

7. The playback device of claim 1, wherein the at least one non-transitory computer-readable medium further comprises program instructions such that the playback device is configured to:
after establishing the first communication link with the first device, receive, from the first device, media content for playback by the playback device; and
while playing back the media content:
detect a second device available for communication with the playback device via the wireless communications interface; and
based on the particular connection configuration, ignore the second device and maintain the first communication link with the first device.

8. The playback device of claim 1, wherein the at least one non-transitory computer-readable medium further comprises program instructions such that the playback device is configured to:
after establishing the first communication link with the first device, receive, from the first device, media content for playback by the playback device; and while playing back the media content:
　detect a second device available for communication with the playback device via the wireless communications interface; and
　based on the particular connection configuration:
　　(i) terminate the first communication link with the first device; and
　　(ii) establish a second communication link with the second device via the wireless communications interface.

9. The playback device of claim 1, wherein the at least one non-transitory computer-readable medium further comprises program instructions such that the playback device is configured to:
　after establishing the first communication link with the first device, receive, from the first device, media content for playback by the playback device; and
　while playing back the media content:
　　detect a second device available for communication with the playback device via the wireless communications interface;
　　determine a second characteristic associated with at least one of: the second device, the playback device, or a context in which at least one of the playback device or the second device is operating;
　　identify an alternative connection configuration in the set of connection configurations, the alternative connection configuration associated with the second characteristic; and
　　based on the alternative connection configuration:
　　　(i) terminate the first communication link with the first device; and
　　　(ii) establish a second communication link with the second device via the wireless communications interface, in accordance with the alternative connection configuration.

10. The playback device of claim 1, wherein:
　before detecting that the first device is available for communication with the playback device via the wireless communications interface, the playback device is configured to receive first media content for playback via an alternative wireless communication interface configured to facilitate communication with other devices via at least one alternative communication protocol; and
　establishing the first communication link with the first device via the wireless communications interface causes the playback device to be configured to receive second media content for playback from the first device via the first communication link.

11. The playback device of claim 1, wherein:
　before detecting that the first device is available for communication with the playback device via the wireless communications interface, the playback device is associated with a second device so that the playback device is configured to receive second media content for playback from the second device; and
　establishing the first communication link with the first device via the wireless communications interface causes the playback device to be configured to receive first media content for playback from the first device via the first communication link.

12. The playback device of claim 1, wherein:
　the playback device is a first playback device;
　before detecting that the first device is available for communication with the first playback device via the wireless communications interface, the first playback device is configured to playback media content together with a second playback device, wherein the first playback device and the second playback device are connected via a second communication link; and
　establishing the first communication link with the first device via the wireless communications interface causes the first playback device to be configured to:
　　receive media content for playback from the first device via the first communication link; and
　　send at least a portion of the media content to the second playback device via the second communication link.

13. A playback device comprising:
　a wireless communications interface;
　at least one processor; and
　at least one non-transitory computer-readable medium comprising program instructions that are executable by the at least one processor such that the playback device is configured to:
　　detect a first device available for communication with the playback device via the wireless communications interface;
　　determine a first characteristic associated with at least one of: the first device, the playback device, or a context in which at least one of the playback device or the first device is operating;
　　select a particular set of rules from a plurality of sets of rules based at least in part on the determined first characteristic, wherein each set of rules in the plurality of sets of rules govern at least one connection handling behavior; and
　　establish a first communication link with the first device via the wireless communications interface in accordance with the particular set of rules, wherein the first communication link enables transmission of media content from the first device for playback by the playback device.

14. The playback device of claim 13, wherein the at least one connection handling behavior comprises permanency of the first communication link when no media content is being transmitted over the first communication link.

15. The playback device of claim 13, wherein the at least one connection handling behavior comprises permanency of the first communication link when an alternative communication link which enables transmission of alternative media content for playback by the playback device is established.

16. A playback device comprising:
　a wireless communications interface configured to facilitate communications with other devices via at least one wireless communication protocol;
　at least one processor; and
　at least one non-transitory computer-readable medium comprising program instructions that are executable by the at least one processor such that the playback device is configured to:
　　detect a first device available for communication with the playback device via the wireless communications interface;
　　determine a first characteristic associated with at least one of: the first device, the playback device, or a context in which at least one of the playback device or the first device is operating;
　　select a particular configuration in a set of configurations based at least in part on the determined first characteristic, wherein each configuration in the set of configurations comprises a value for at least one parameter required by the at least one wireless communication protocol; and establish a first communication link with the first device via the wireless communications interface in accordance with the particular configuration, wherein the first communication link enables transmission of media content from the first device for playback by the playback device.

17. The playback device of claim 16, wherein:

the at least one wireless communication protocol comprises BLUETOOTH; and the at least one parameter comprises a Link_Supervision_Timeout parameter.

18. The playback device of claim 16, wherein before establishing the first communication link with the first device, the playback device is configured to:

detect a second device available for communication with the playback device via the wireless communications interface;

determine a second characteristic associated with at least one of: the second device, the playback device, or a context in which at least one of the playback device or the second device is operating;

identify an alternative configuration in the set of configurations, the alternative configuration based on the second characteristic; and based on the particular configuration and the alternative configuration, identify the first device as a device with which the first communication link is to be established.

19. The playback device of claim 16, wherein detecting that the first device is available for communication with the playback device via the wireless communications interface comprises:

broadcasting at least one advertising message indicating that the playback device is available for communication via the wireless communications interface; and after broadcasting the at least one advertising message, receiving a connection request from the first device.

20. The playback device of claim 16, wherein detecting that the first device is available for communication with the playback device via the wireless communications interface comprises:

sending at least one advertising message to the first device indicating that the playback device is available for communication via the wireless communications interface; and after sending the at least one advertising message, receiving a connection request from the first device.

* * * * *